(12) United States Patent
Ozdemir et al.

(10) Patent No.: US 8,169,481 B2
(45) Date of Patent: May 1, 2012

(54) SYSTEM ARCHITECTURE AND PROCESS FOR ASSESSING MULTI-PERSPECTIVE MULTI-CONTEXT ABNORMAL BEHAVIOR

(75) Inventors: Hasan Timucin Ozdemir, Plainsboro, NJ (US); Hongbing Li, Belle Mead, NJ (US); Lipin Liu, Belle Meade, NJ (US); Kuo Chu Lee, Princeton Junction, NJ (US); Namsoo Joo, Someset, NJ (US)

(73) Assignee: Panasonic Corporation, Osaka (JP)

( * ) Notice: Subject to any disclaimer, the term of this patent is extended or adjusted under 35 U.S.C. 154(b) by 1031 days.

(21) Appl. No.: 12/034,181

(22) Filed: May 5, 2008

(65) Prior Publication Data

US 2009/0276705 A1 Nov. 5, 2009

(51) Int. Cl.
H04N 7/18 (2006.01)
(52) U.S. Cl. ........ 348/155; 348/143; 348/152; 348/153; 348/154
(58) Field of Classification Search .................. None
See application file for complete search history.

(56) References Cited

U.S. PATENT DOCUMENTS

| | | | |
|---|---|---|---|
| 6,441,734 B1 | 8/2002 | Gutta et al. | |
| 6,950,123 B2 | 9/2005 | Martins | |
| 7,539,637 B2 * | 5/2009 | Gatto | 705/36 R |
| 7,894,650 B2 * | 2/2011 | Weng et al. | 382/128 |
| 2002/0008758 A1 | 1/2002 | Broemmelsiek et al. | |
| 2004/0024738 A1 * | 2/2004 | Yamane | 707/1 |
| 2005/0104962 A1 | 5/2005 | Han et al. | |
| 2005/0169367 A1 | 8/2005 | Venetianer et al. | |
| 2006/0045185 A1 * | 3/2006 | Kiryati et al. | 375/240.16 |
| 2006/0239506 A1 | 10/2006 | Zhang et al. | |
| 2007/0250898 A1 | 10/2007 | Scanlon et al. | |
| 2008/0240578 A1 * | 10/2008 | Gudmundson et al. | 382/218 |

FOREIGN PATENT DOCUMENTS

WO WO 2008/008505 1/2008

OTHER PUBLICATIONS

Hu, W, et al., "A Survey on Visual Surveillance of Object Motion and Behaviors", IEEE Transactions on Systems, Man, and Cybernetcis: Part C: Applications and Reviews, IEEE Service Center, Piscataway, NJ, US, vol. 34, No. 3, pp. 334-352, Aug. 1, 2004, XP-0111114887, ISSN: 1094-6977.
"LSCOM Lexicon Definitions and Annotations, Version 1.0", DTO Challenge Workshop on Large Scale Concept Ontology for Multimedia, Columbia University ADVENT Technical Report #217-2006-3, 88 pages, Mar. 2006.
"VERL: An Ontology Framework for Representing and Annotating Video Events", A.R.J. Francois, et al., IEEE Multimedia, pp. 76-86, Oct.-Dec. 2005.

* cited by examiner

*Primary Examiner* — Thu Nguyen
*Assistant Examiner* — Nam Tran
(74) *Attorney, Agent, or Firm* — Harness, Dickey & Pierce, P.L.C.

(57) ABSTRACT

A multi-perspective context sensitive behavior assessment system includes an adaptive behavior model builder establishing a real-time reference model that captures intention of motion behavior. It operates by modeling outputs of multiple user defined scoring functions with respect to multiple references of application specific target areas of interest. The target areas have criticality values representing a user's preference regarding the target areas with respect to one another. The outputs of the scoring functions are multiplied by the critically values to form high level sequences of representation that are communicated to the user.

22 Claims, 20 Drawing Sheets

US 8,169,481 B2

SYSTEM ARCHITECTURE AND PROCESS FOR ASSESSING MULTI-PERSPECTIVE MULTI-CONTEXT ABNORMAL BEHAVIOR

FIELD

The present disclosure generally relates to behavior assessment of moving objects for multiple applications that share the same moving object surveillance system infrastructure.

BACKGROUND

The statements in this section merely provide background information related to the present disclosure and may not constitute prior art.

A typical moving object detection system operates by a process that performs the following steps: (a) generating object trajectories from video with multiple motion objects under different lighting and occlusion conditions; (b) clustering trajectories into flow patterns and predicting one or more trajectories based on the flow patterns; (c) detecting one or more abnormal trajectories based on normal flow patterns; (d) analyzing the behavior of trajectories and creating one or more ontologies of behavior patterns; and (e) employing the ontology with a multiple camera tracking system.

The typical process involves processing of trajectory points using a transformation function that is independent of application contexts. As a result, these methods cannot be used to derive a detection function that will capture the intention of the motion trajectory with respect to the targets of interests in the field of view of camera and the criticality of a target relative to other targets when a moving object is approaching a target. Both of these contexts are important for security and marketing applications.

The deployed surveillance systems could be used for other purposes than only the surveillance purpose. Such multi purpose usage of the surveillance system requires an architecture and process which enables multiple applications to share the surveillance system resources (devices and various servers). This approach is beneficial for the user since the justification of the system purchase could be represented in real dollar terms.

Today's surveillance systems have a number of limitations. For example, accuracy is not satisfactory. Multiple tracking algorithms have been proposed and work under controlled environment. However, the accuracy has not reach to an acceptable level. Also, today's systems are difficult to set up and use. Since most of the methods do not yield high accuracy for all cases, it is necessary to select the situation and customize the parameters of the detection model based on the context. Further, the CPU intensive costs of today's systems limit the application of one tracking system to a limited number of cameras. Finally, today's systems are limited in adaptability because most of the systems cannot adapt to changing fields of views. This inability to adapt limits the application of tracking systems to only one field of view or a limited number of objects for PTZ cameras.

SUMMARY

A multi-perspective context sensitive behavior assessment system includes an adaptive behavior model builder establishing a real-time reference model that captures intention of motion behavior. It operates by modeling outputs of multiple user defined scoring functions with respect to multiple references of application specific target areas of interest. The target areas have criticality values representing a user's preference regarding the target areas with respect to one another. The outputs of the scoring functions are multiplied by the criticality values to form high level sequences of representation that are communicated to the user.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1A:
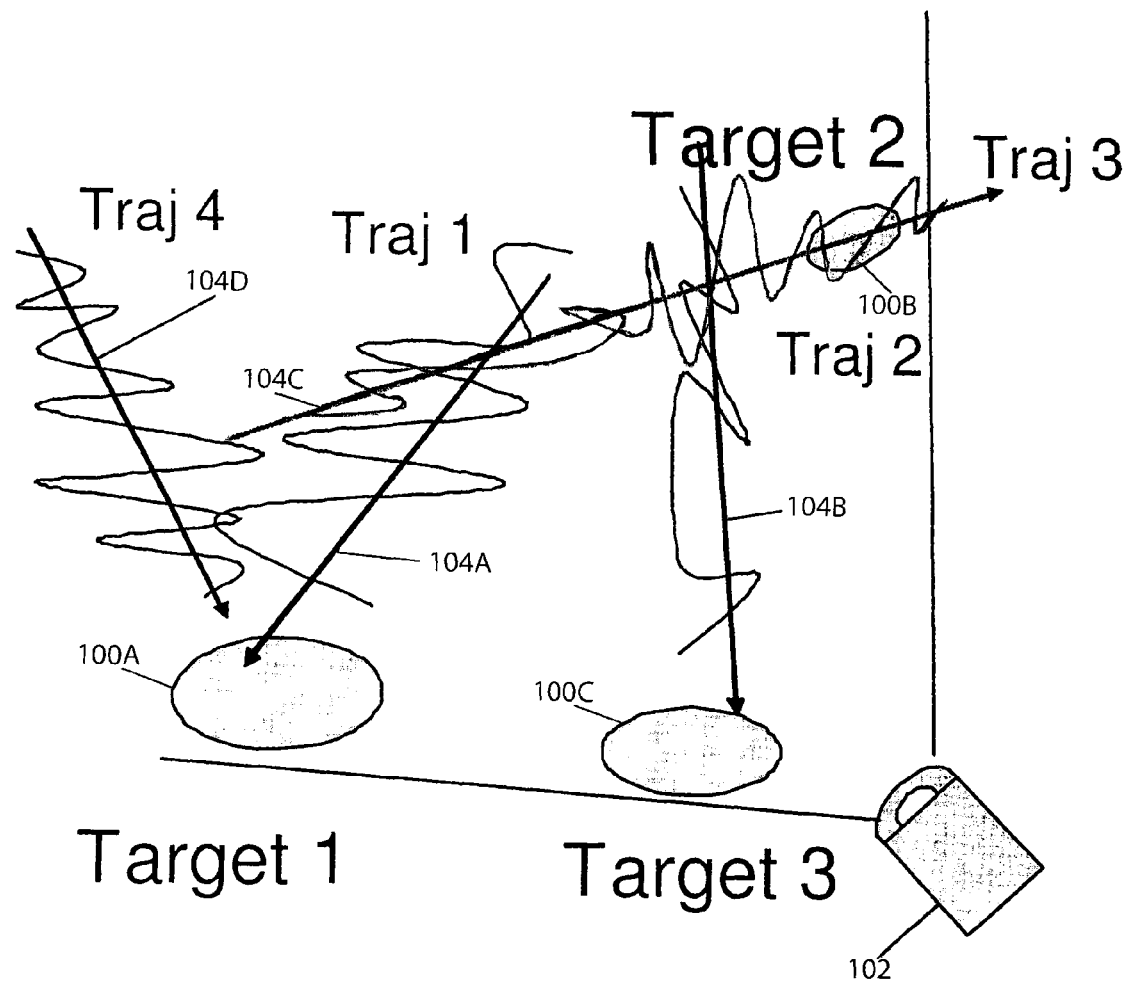
FIG. 1A is a top-down view illustrating observations on trajectories.

The following description is merely exemplary in nature and is not intended to limit the present disclosure, application, or uses.

By way of overview, some embodiments correspond to a context sensitive behavior detection and prediction system that includes an Adaptive Behavior Model Builder that establishes a real-time reference model. This model captures intention of motion behavior by modeling outputs of multiple user-defined scoring functions with respect to multiple reference targets of interests. These targets are defined for each application context that is a description of the application. An intention function avoids having to employ a large number of rules to specify specific conditions and thresholds for the scoring functions, which cannot be easily done in a changing environment with many devices. The intention function is calculated relative to a dynamically accumulated behavior model containing basic measurement data derivable from the motion trajectories. This relative measure is different from absolute measurement in that it can be adapt to a new behavior pattern. The scoring function outputs are multiplied with a criticality value representing the user's preference to the target areas of interests in the application context.

Combined intentions toward multiple targets are further converted to high level behavior labels by the user. The high level behavior user labeling forms high level sequences of representation. These sequences of representation are managed and interpreted much more efficiently than a large number of low level trajectories data. Furthermore, the scoring functions execute location sensitive multi-resolution transformation that captures the variation of motion in multiple iterative transformed domains. This capturing of the variation detects variation with different levels of resolution and cross relationships.

After the trajectories are scored based on each target and a set of scoring functions that capture the intention of the motion, the outputs of target-score pairs are filtered around the min or max scores for each of the trajectories. The data is rendered in a dash board for the user to quickly visualize the sequences of min-max sample scores and provide feedback to classify or filter out the sequences of labeled detection. The sequence are represented by multiple targets and scores (e.g., min-max and average values with time stamps are stored in a multi-dimensional database). By providing a given (new) trajectory's target-score sequences, similarity between sequences is determined by a distance function definable by the end user (e.g., mean square error with time or without time).

Multiple perspectives are defined by a set of intentions evaluated based on aggregated scores deviated from a normal behavior model generated from low level trajectory data. The aggregation goes one level beyond typical scoring methods where sample points are scored against the normal behavior model. The aggregated score combines scores of multiple sample points with respect to selected targets. The aggregated score also provides quantitative evaluation of object behavior as opposed to a user defined threshold that could result in frequent change due to environment and application context changes.

The system is made up of three stages. The first stage conducts normal behavior model building based on trajectory motion data without Target and Application contexts. The second stage is the application of multiple user-defined intention scoring functions and targets of interests. The third stage is the reduction of the multiple intention score assessments that are normalized with score assessment models and weighted with the criticality of each application target to allow for scalable execution and efficient observations.

Regarding the second stage, the targets of interest for each application are associated with different criticality assessments. The assessment of criticality is based on application requirements and can be completely different from application to application. The system allows concurrent execution of multiple abnormal score aggregation and combination of aggregation that converts the temporal and spatial trajectory data into intention abnormality assessment scores with respect to different target areas of interest for each application. The aggregation of point scores captures the repetitive behavior and behavior trends. The combination of multiple types of aggregated scores captures the abnormality of the behavior from different application perspectives.

Regarding the third stage, the reduction stage takes the key statistical sample properties of long sequences of scores into a user defined behavior assessment score summary. This summary captures the application perspectives with respect to the targets of interests. For each target-intention aggregation score pair, a ranked assessment of maximal, mean, and deviation from a set of previously collected intention score assessment model is generated. This ranked assessment represents the degree of abnormality that can be assessed easily in temporal order. The output of the abnormality score is normalized and displayed in real-time abnormal behavior assessment dash board and dispatched to other system modules for effective management of storage resources in real-time. This dispatch also provides efficient human resource dispatching operations.

An advantage of abnormality intention assessment is that it not only provides intuitive output to multiple types of application users such as marketing, safety and security personnel. It also can provide an intuitive forensic indexing scheme that supports multiple perspectives and views for different applications. The motion trajectory data is re-purposed differently for each application based on specific needs of each application. The application specific high level representation is stored to support application specific offline data analysis, such as event queries and report generation for event distribution to decide the security personal need.

Delving now into more detail, and referring generally to FIG. 1-FIG. 13, some embodiments correspond to an architecture and process that integrates dynamically defined application contexts. These contexts assess the behavior for different applications, such as the security, safety, productivity, and marketing applications. The behavior assessment system that implements this architecture and process has a context sensitive, multi-model, multi-sensor behavior feature extraction function. This function employs multiple basic motion tracking and basic feature extraction methods. These methods observe properties of motion objects from one or more sensors with respect to multiple target area of interests. Multiple adaptive behavior models accumulate the statistical behavior of basic motion tracking and feature extraction outputs. Multiple target regions of interests are defined by multiple applications for the same camera field of view. Multiple behavior detection application contexts and weights are employed.

Real time video mining function modules include a model builder for building the adaptive behavior models. One or more user interfaces permit users to define the target types, locations, and weights (criticality of target with respect to the other targets in the application context). Behavior detection scoring functions measure and accumulate a set of target dependent behavior properties. Feature extraction and target specific scoring functions summarize and map key characteristics of how the moving objects are related to each target and to one another. A multi-dimensional database is augmented for fast search of similar behaviors using data generated from the feature extraction and reduction functions.

The behavior assessment system employs a context aware method to capture application context to reduce tracking error based on selection of multiple regions of interests (target areas of interest). This method can have clear observation of the motion objects and score the intention of moving objects against the target regions. This method accomplishes automatic transformation of motion trajectories to multiple target specific scores. These scores reflect the application context in the form of intention of motion towards multiple targets of interest having different levels of criticality. This method also provides a method for aggregating the scores based on multiple criteria. These criteria include accumulative mean and max at different levels of resolution toward each target of interest defined by users. This method additionally provides a fast search process based on similarity of scores in real-time to classify and rank the behavior of the motion trajectories. This method can further reduce tracking error by selecting targets of interest. The selection is performed by giving higher weight to targets with relatively lower observation errors (such as selecting target distance measure angle with minimal fluctuation).

Figure 14:
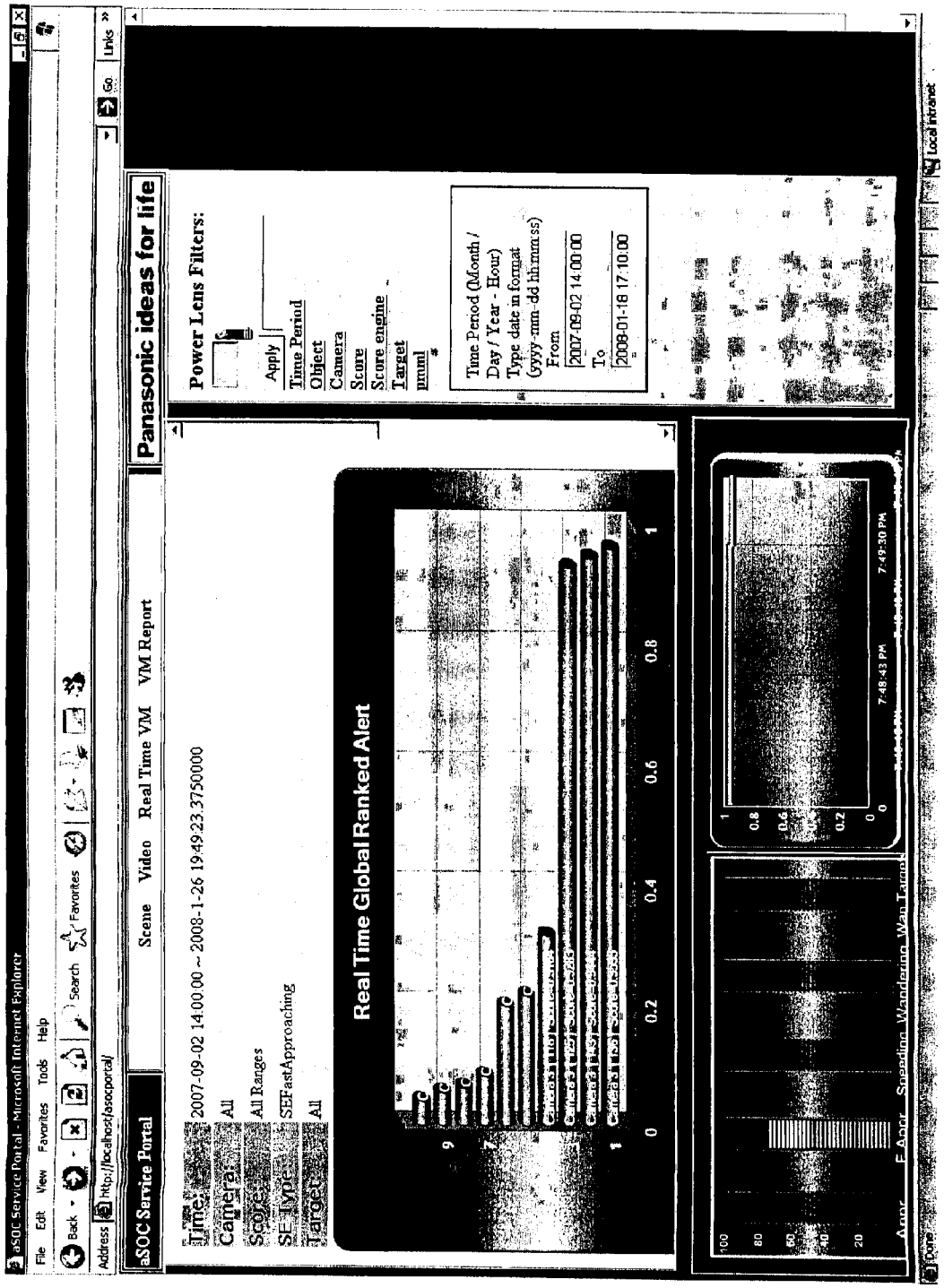
FIG. 14 is a graphical representation illustrating real time global severity summary reports and a real time severe alert score dashboard view illustrating observations on the score of highest severity alerts along the timeline.
Figure 15:
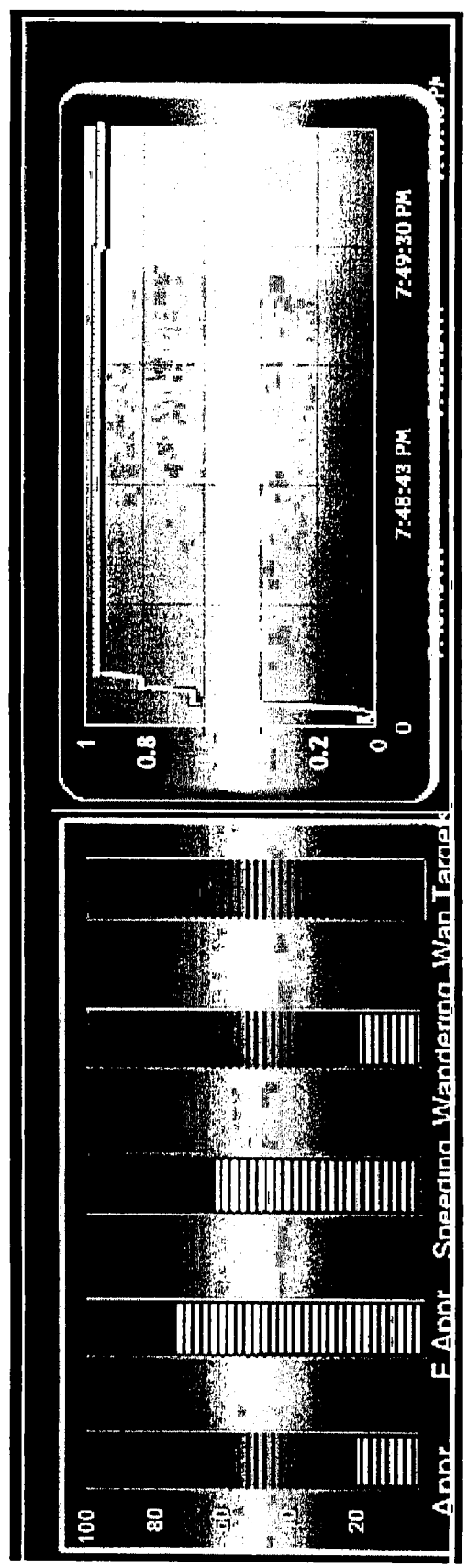
FIG. 15 is a graphical representation illustrating the real time abnormal behavior assessment dashboard that contains the individual highest score gauge and global severe alert score chart.
Figure 16:
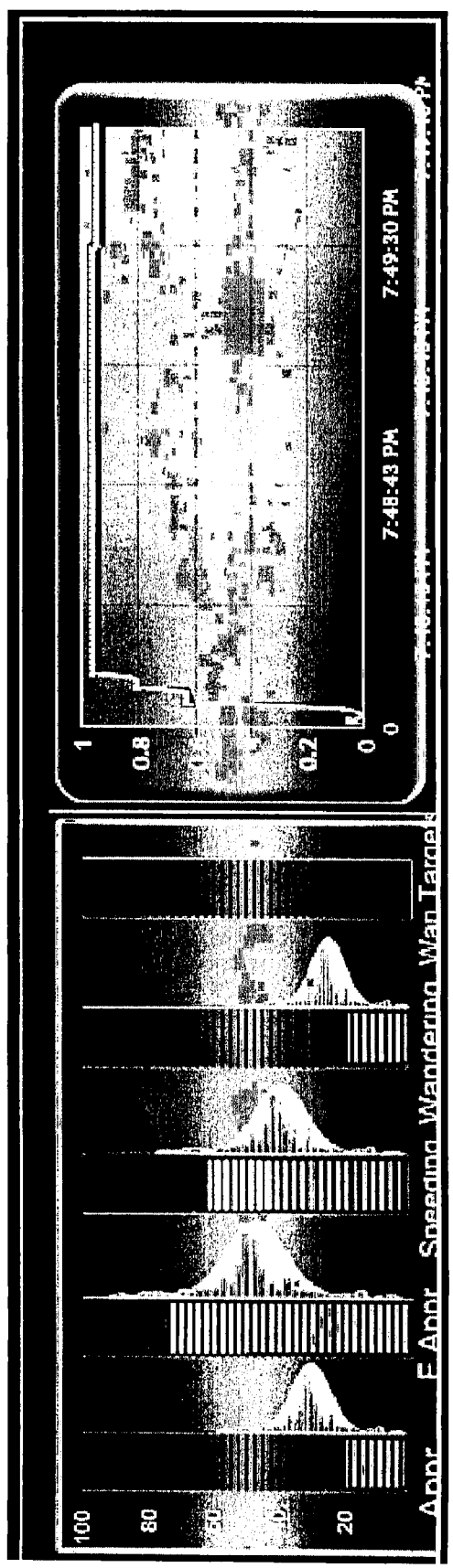
FIG. 16 is a graphical representation illustrating the option of displaying distribution of scores for the individual highest score gauge that allows global ranking score adjustment.

Referring now generally to FIGS. 14-16, the system provide several summary views including a real time global severity summary dashboard, individual score gauge dashboards, real time global ranked severity alert report, and top ranked alert reports. The summary reports system can dynamically aggregate motion behavior score data from one or multiple distributed scoring sources or a distributed data warehouse. The real time severity ranked alert chart displays the real time top ranked scores among all selected types of scoring functions in the chart. The real time severity ranked alert chart provides users with an understanding of the up-to-current top severity ranked alert incidents and provides priority for alarm handling. The real time severity ranked alert chart uses query criteria information including the time range, cameras, the objects, scoring function types, and score range. The real time severity ranked alert chart report shows the information of high ranked alert items, including camera identifier, object identifier, score, scoring function type, and drill-down details network link.

Delving now even into further detail, and starting with reference to FIG. 1A, a number of target regions 100A, 100B, 100C, and 100D are predefined within a field of view of a camera 102. These target regions are points, lines, ellipses, and/or polygons. The target regions are predefined by users who employ a GUI to define the regions. Users employ a pointing device such as a mouse to click on points of interest in a camera's field of view. For example, users click and drag in the field of view to draw an ellipse or polygon. Alternatively or additionally, users specify a shape to be positioned at the point of interest. Exemplary trajectories 104A, 104B, 104C, and 104D are shown in FIG. 1A.

It should be readily understood that trajectories tend to have measurement errors and often require curve smoothing and prediction. Also, static environment factors can have dominant statistical error distribution that can be calibrated. Further, for each sensor set up, some targets have better signal to noise ratio than others when observing trajectories at different locations.

By way of example, trajectory 104B has a high error for velocity detection toward target 100C. Reducing the error requires changing the sensor position. Also, trajectory 104A and trajectory 104D have significantly different direction and trajectories. But when applying the context aware, target approaching scoring function for target 100A, both trajectories have similar distance scoring patterns with different levels of max, medium, and counts, etc.

Figure 1B:
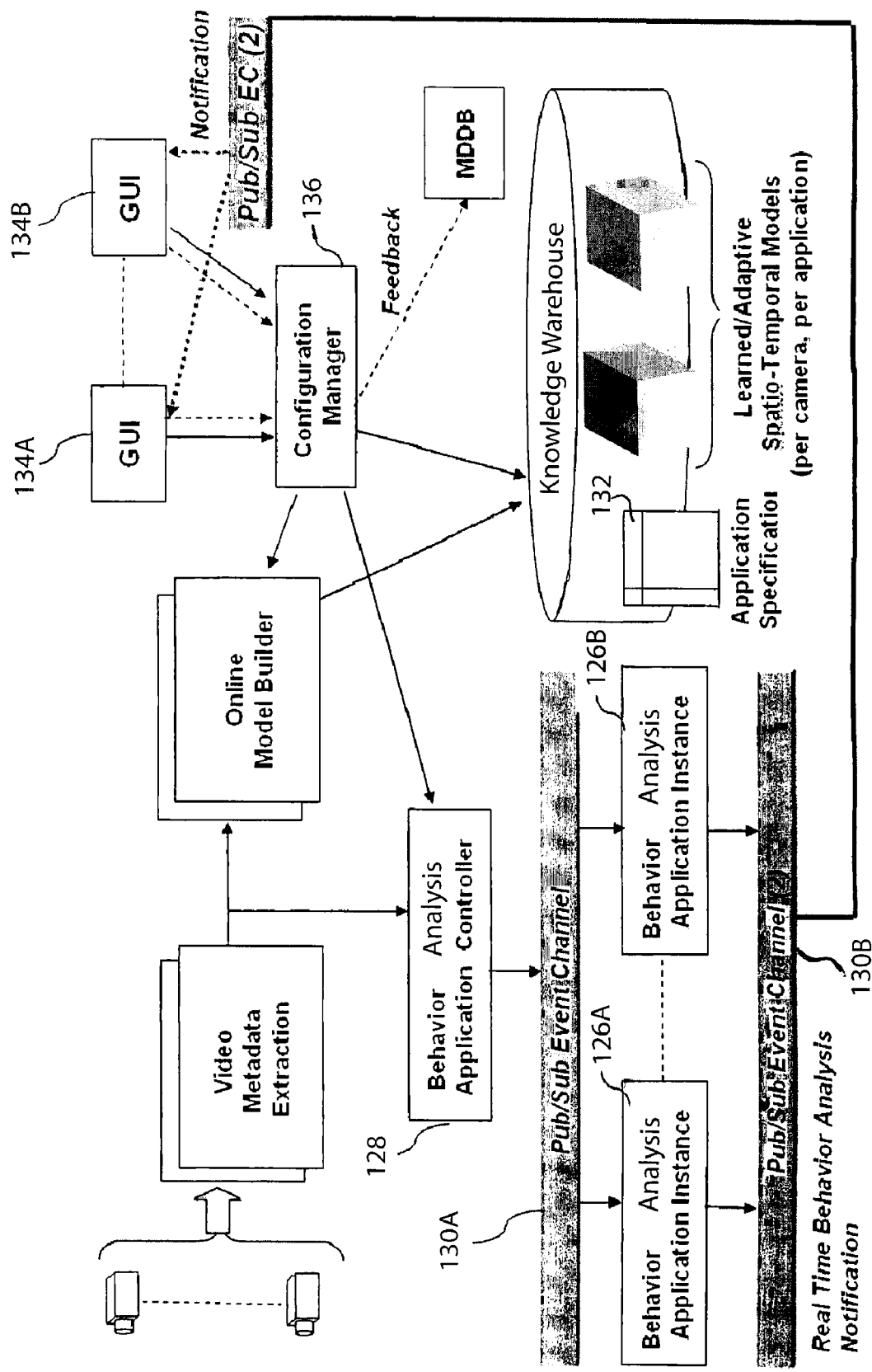
FIG. 1B is a functional block diagram illustrating a behavior assessment system supporting distributed deployment of multiple applications.

Turning now to FIG. 1B, each application defines its own set of target areas and behavior assessment modules. The system is responsible for execution of each customer specific application. The multiple applications share the same infrastructure.

Application Controller 128 is responsible for creating Application Instances 126A-126B in the system and connecting them to data flow through publish/subscribe based event channels 130A-130B. The proposed architecture enables distributed deployment of Application Instances 126A-126B and thus provides scalability. The Application Instances 126A-126B are specified in Application Specification Table 132 in which application name, system assigned unique identifiers, set of attached behavior detectors, application context specific target descriptions, and the target-scoring engine associations are stored. Application Controller 128 instantiates the Application Instances 126A-126B based on this specification. In the case a distributed system is used, a Host Application Controller is responsible for performing the necessary instantiation process upon receipt of an Application Instance Create request from Application Controller 128.

Figure 1C:
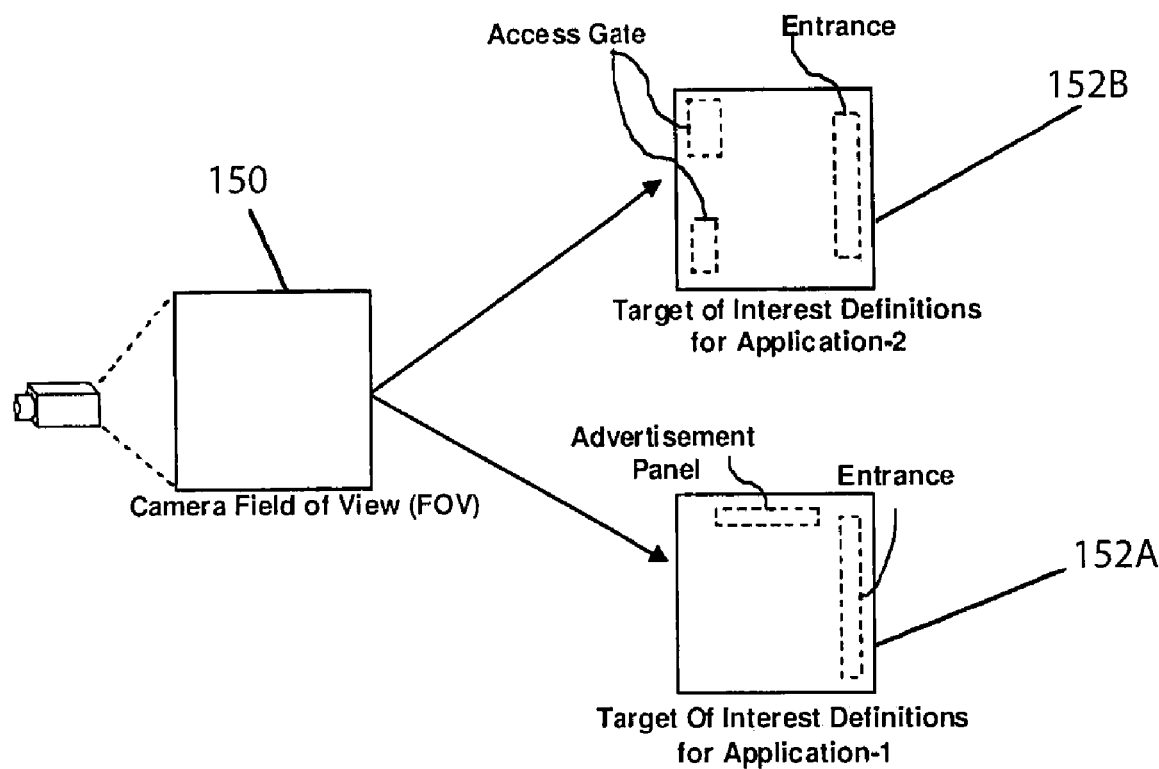
FIG. 1C is a functional block diagram illustrating multiple applications bound to the same camera.

Referring now to FIG. 1C, within a camera's field of view 150, each application can define its own set of targets 152A and 152B specific to its usage of the system. For example, a marketing department may be interested in the number of people who spend time in front of the advertisement panel and what the average time spent in front of the panel. Thus, the marketing department has its application set up to track these data using the target set 152A. In contrast, security personnel may be interested in recording video footage when a person runs towards an access gate. Thus, the security personnel have their own application performing this function using the target set 152B.

Figure 2:
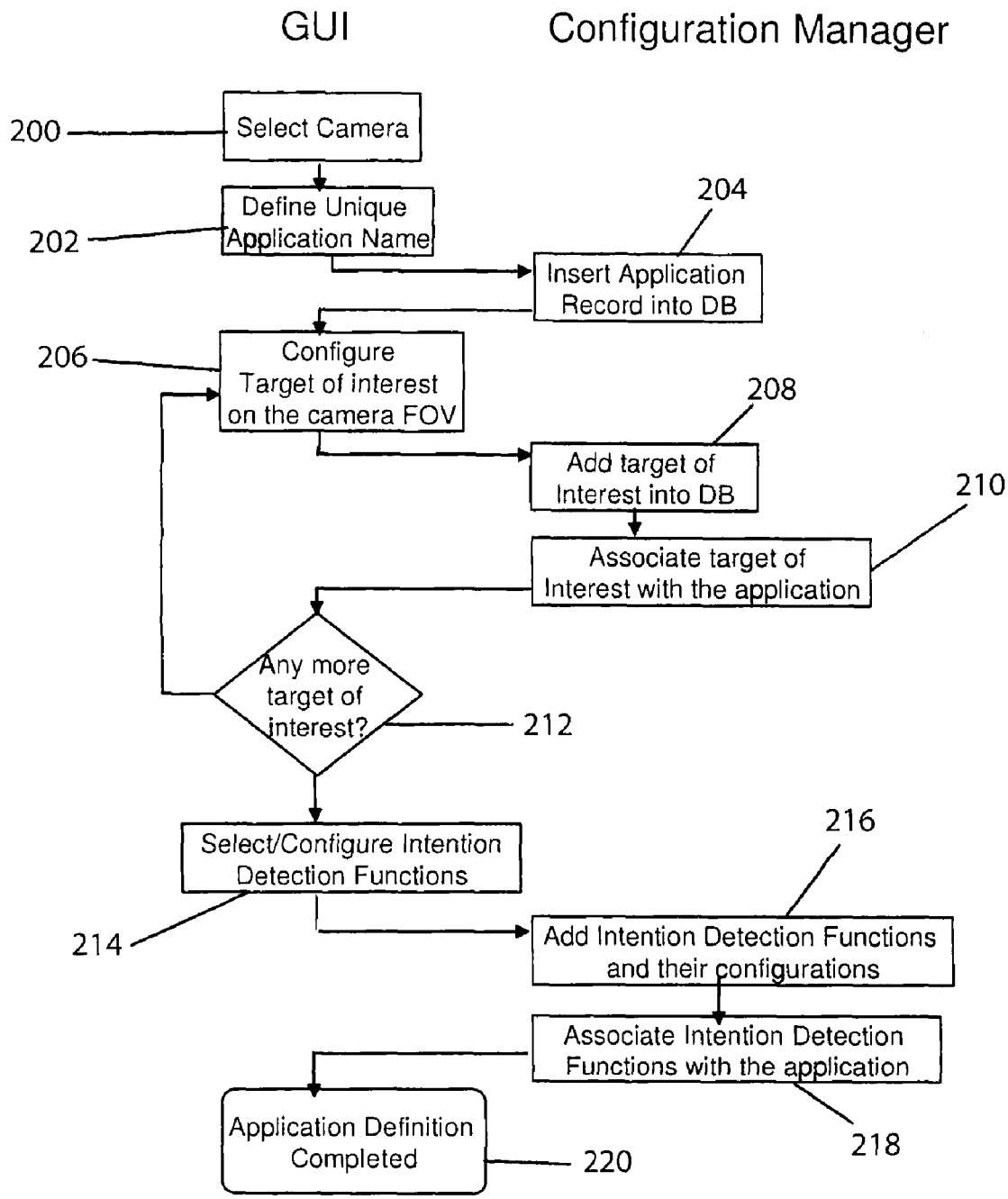
FIG. 2 is a swim lane diagram illustrating an application configuration flow.

Returning now to FIG. 1B, the GUI 134A and 134B and the configuration manager 136, interact as described with reference to FIG. 2. First of all. A user employs the GUI to select a camera at 200, and then defines a unique application name at step 202. In response, the configuration manager inserts an application record into a database at step 204. Next, the user employs the GUI to configure a target of interest on the camera field of view at step 206. In response, the configuration manager adds the target of interest into the database at step 208, and associates the target of interest with the application at step 210. Steps 206-208 occur iteratively until it is determined that there are no more targets of interest at decision step 212. Then the user employs the GUI to select/configure the intention detection functions at step 214. In response, the configuration manager adds the intention detection functions and their configurations to the database at step 216, and associates the intention detection functions with the application at step 218. At this point, the application definition is completed at 220.

Figure 9:
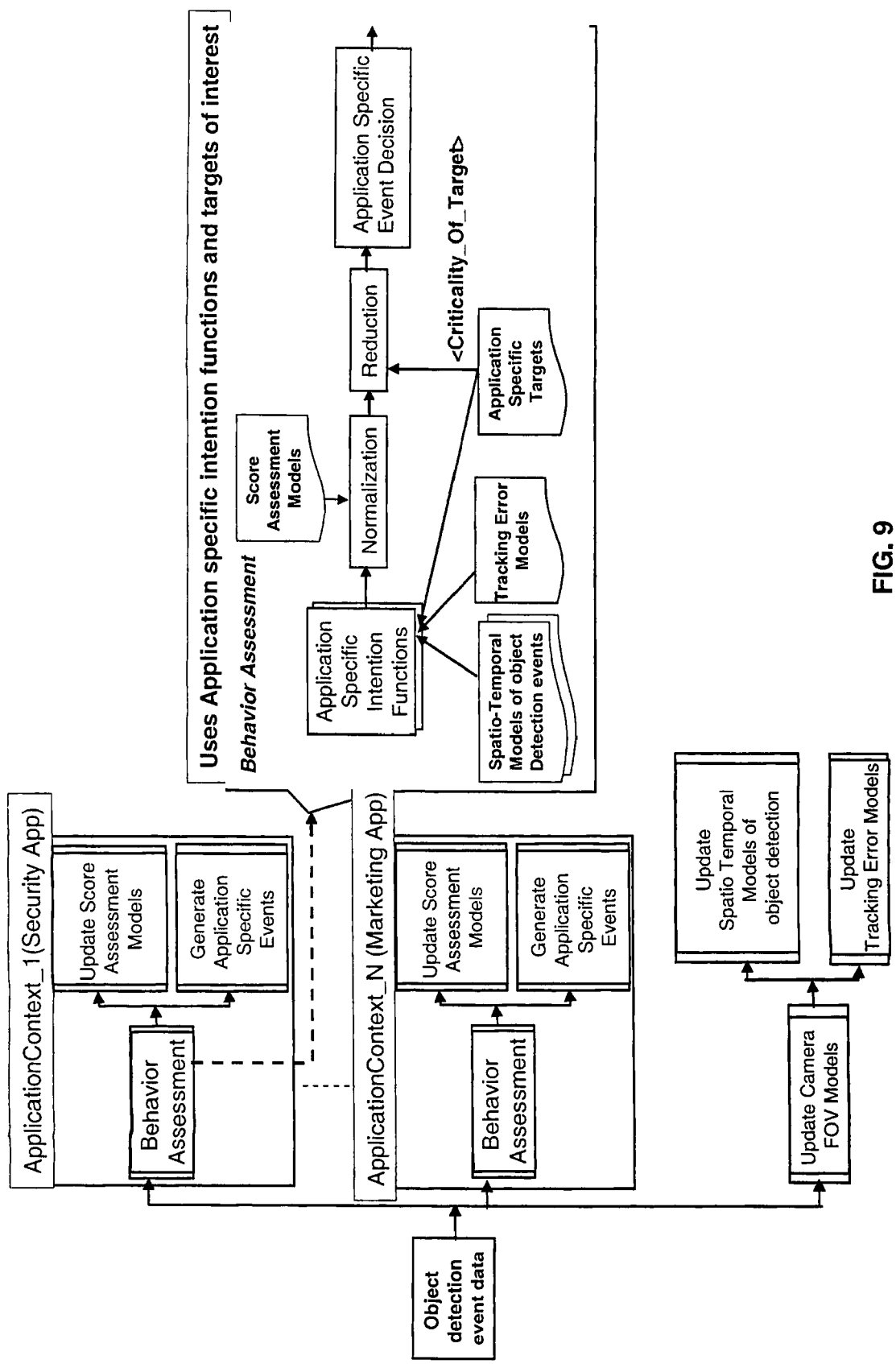
FIG. 9 is a functional block diagram illustrating the behavior assessment system.

Turning now to FIG. 9, each object detection event is distributed to multiple application contexts as well as the camera field of view of specific model update modules. Each application context processes the object detection event and transforms the object detection event into an application specific event. The process includes the execution of a set of application specific intention functions to obtain a score value, normalize the score value with the observed score assessment models of the application, decide the application specific event, and generate the application specific event. Each intention function (later described as scoring functions) uses application's targets of interest descriptions, the associated spatio-temporal motion models with respect to field of view of camera, and tracking error models with respect to the field of view of a camera to generate a score value.

An object detection event contains at least a camera identifier, field of view identifier, time and date, object identifier, object detection state, coordinates of center of object in field of view, attributes of a minimum bounding box that encloses the detected object, silhouette of an object, and additional appearance features associated with a detected object. The object detection state is defined with the following states: (a) detected (first observation of moving object); (b) observing; (c) disappeared; and (d) reappeared. The attributes of the minimum bounding box includes two coordinate values; one represents the upper-left coordinate of the minimum bounding box, and the second represents the lower-right coordinate of the minimum bounding box. The width and height of the minimum bounding box can be readily extracted from this data. The number of pixels in silhouette of a detected object is also extracted and referred to as blob size. Additional appearance features of an object (although not limited with these examples) can be height of an object in real world coordinates, color, shape, etc., and visual and temporal descriptors that can be extracted from image data of the object.

Turning now to FIG. 14, application specific events are published in the system for multiple consumers to use. One component collects the published application data and stores into a database associated with the detection motion trajectory for offline data processing. Application context GUI components utilize application specific event data to display in an abnormal behavior assessment dashboard. Application specific event data contains at least camera identifier, field of view identifier, time and date, object identifier, array of behavior assessment values that contains the application specific behavior types, and their confidence probabilities.

Turning now to FIG. 15, the real time abnormal behavior assessment dashboard shows the current highest score among all scores. It provides global understanding of highest score incident among specified monitoring criteria. The real time abnormal behavior assessment dashboard is also used with other reports to perform advanced behavior analysis such as moving object trajectory toward targets analysis.

Turning now to FIG. 16, the score gauge provides the statistical distribution summary of historical score data which is displayed on the side of the gauge as an option. The global ranking on the score is compared not only from multiple scoring sources of same types, but also from multiple scoring sources of different scoring function types. The global ranking alert report needs to have a global normalized score for ranking scores from all different sources (i.e. cameras) of the same type of scoring function as well as for all different types of scoring functions. The system dynamically calculates the score scaling based on a learned historical score data model for global score adjustment and normalization.

Figure 10:
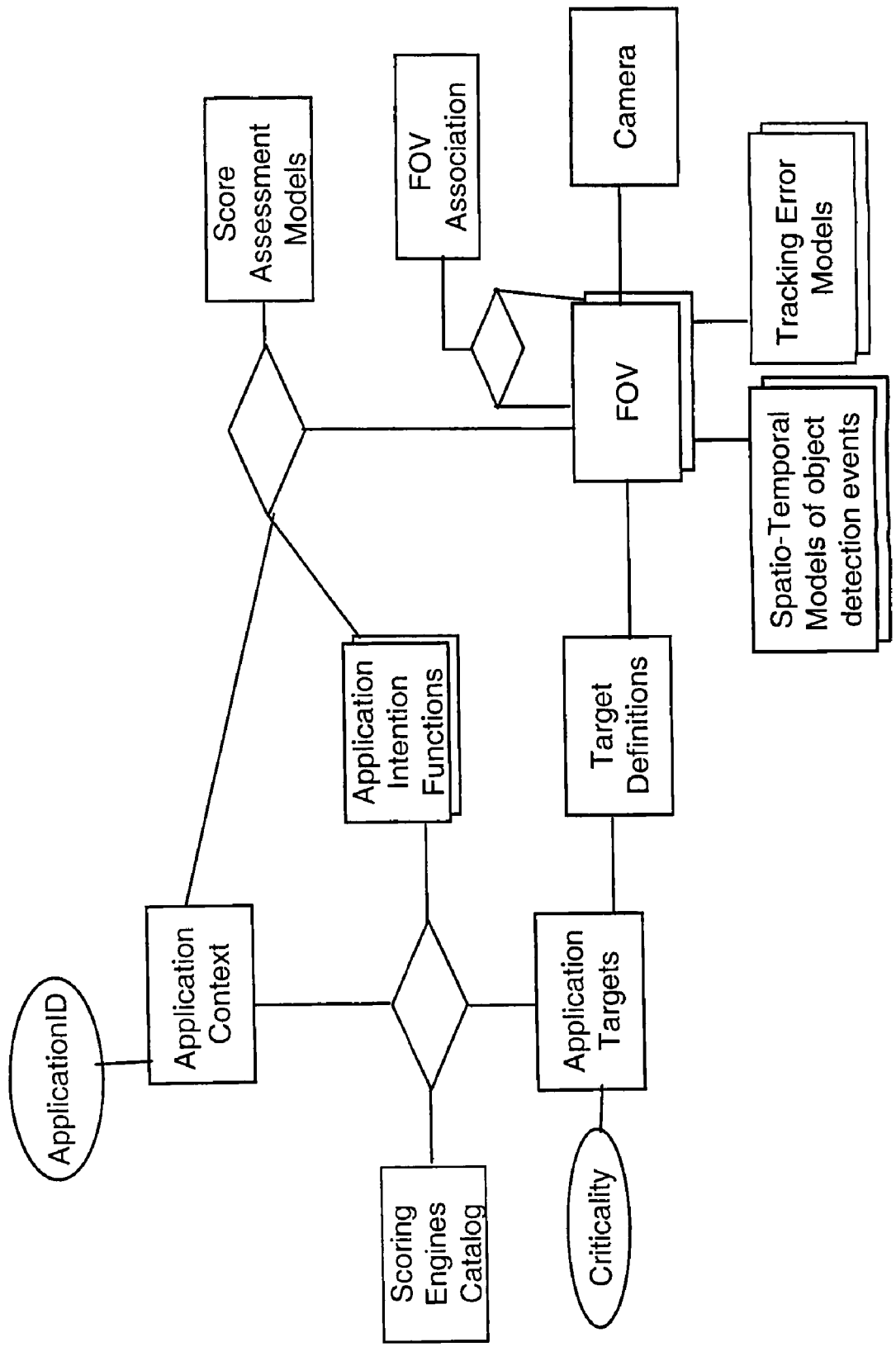
FIG. 10 is a functional block diagram illustrating a system data model.

Turning now to FIG. 10, the a data model if the system is related to behavior assessment. Each application context defines a set of application specific intention functions by defining application targets, associating scoring engines from a scoring engines catalog with the application targets, and assigning a criticality score to each application's target of interest. Each application context has score assessment models that are utilized during the behavior assessment function to normalize the score values obtained from intention functions. The score assessment model is dynamically updated by using the score values obtained from a set of application intention functions.

Application targets are associated with physical target descriptions that are defined on a specific field of view of a camera. Thus, the target definition at the application level can contain multiple physical target descriptions in different fields of view of cameras. In the case of a distributed camera system, application target descriptions can be mapped to physical target descriptions on fields of view of different cameras. This model enables usage of more accurate scoring results for behavior assessment. In the case of a single camera with multiple fields of view, the location of the target and the availability of the target in the active field of view of the camera are deduced for behavior assessment. When the field of view of the camera is changed, the physical target definition associated with the application target definition is deduced from an FOV Association table. This table contains information about associations between fields of view within a camera and across cameras. Furthermore, the flexible model allows an application user to select the target with high accuracy for intention evaluation functions. The user can display the tracking error models of fields of view of cameras to decide while deciding the definition of target of interest for the application context.

Figure 3A:
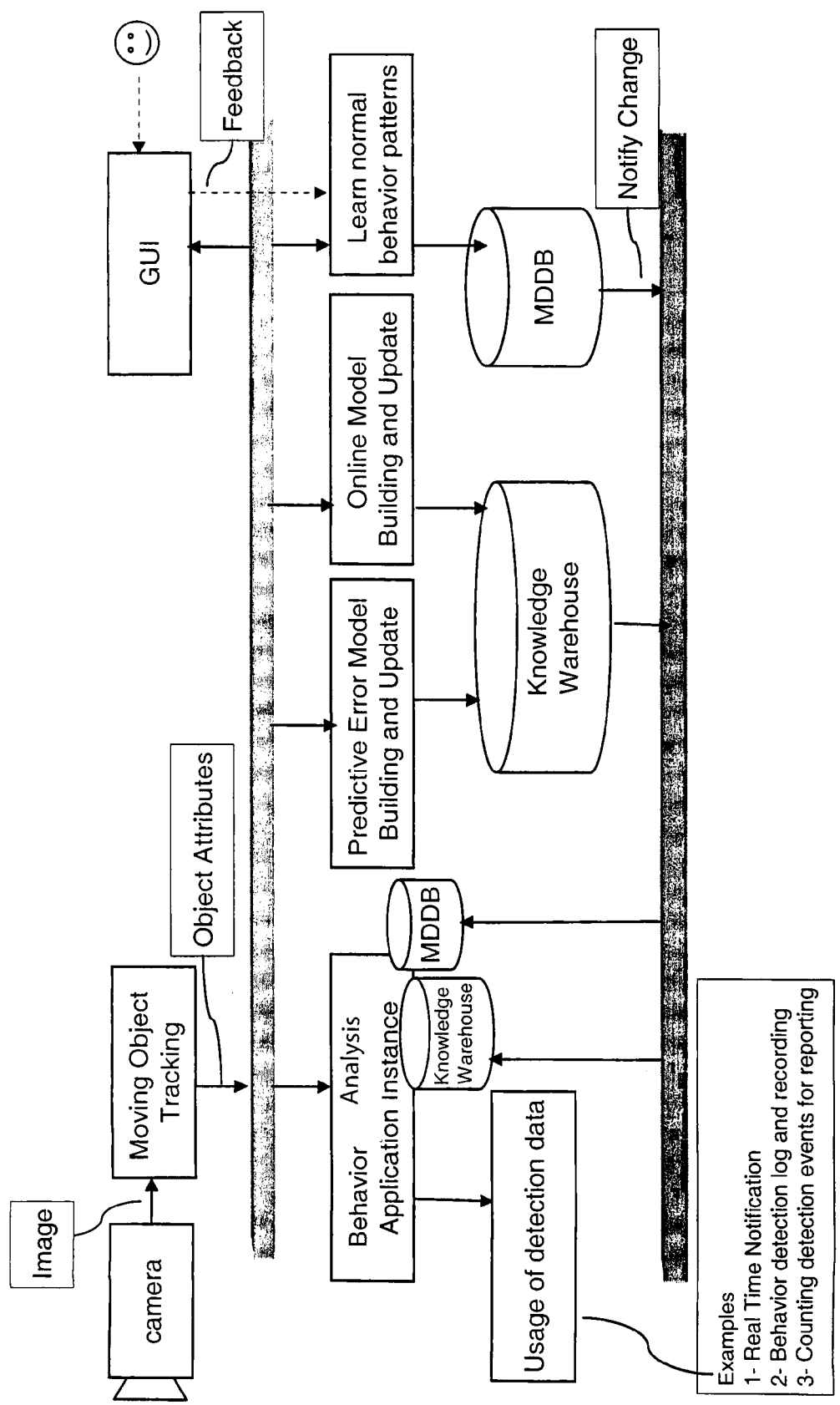
FIG. 3A is a functional block diagram illustrating a behavior assessment system.

Referring now to FIG. 3A, a Behavior Assessment Application Instance receives the object detection events from an event channel and publishes the application specific events based on the behavior assessment procedure. The output application specific events are received by GUI components for real time display of abnormal behavior assessment results and stored in the database for further offline analysis. The object detection event is also received by Predictive Error Model Update module to update the tracking error models associated with fields of view of cameras. The object detection event is also received by Online Model Update module to update the spatio-temporal object detection event models (described in detail below) associated with field of view of camera.

Figure 3B:
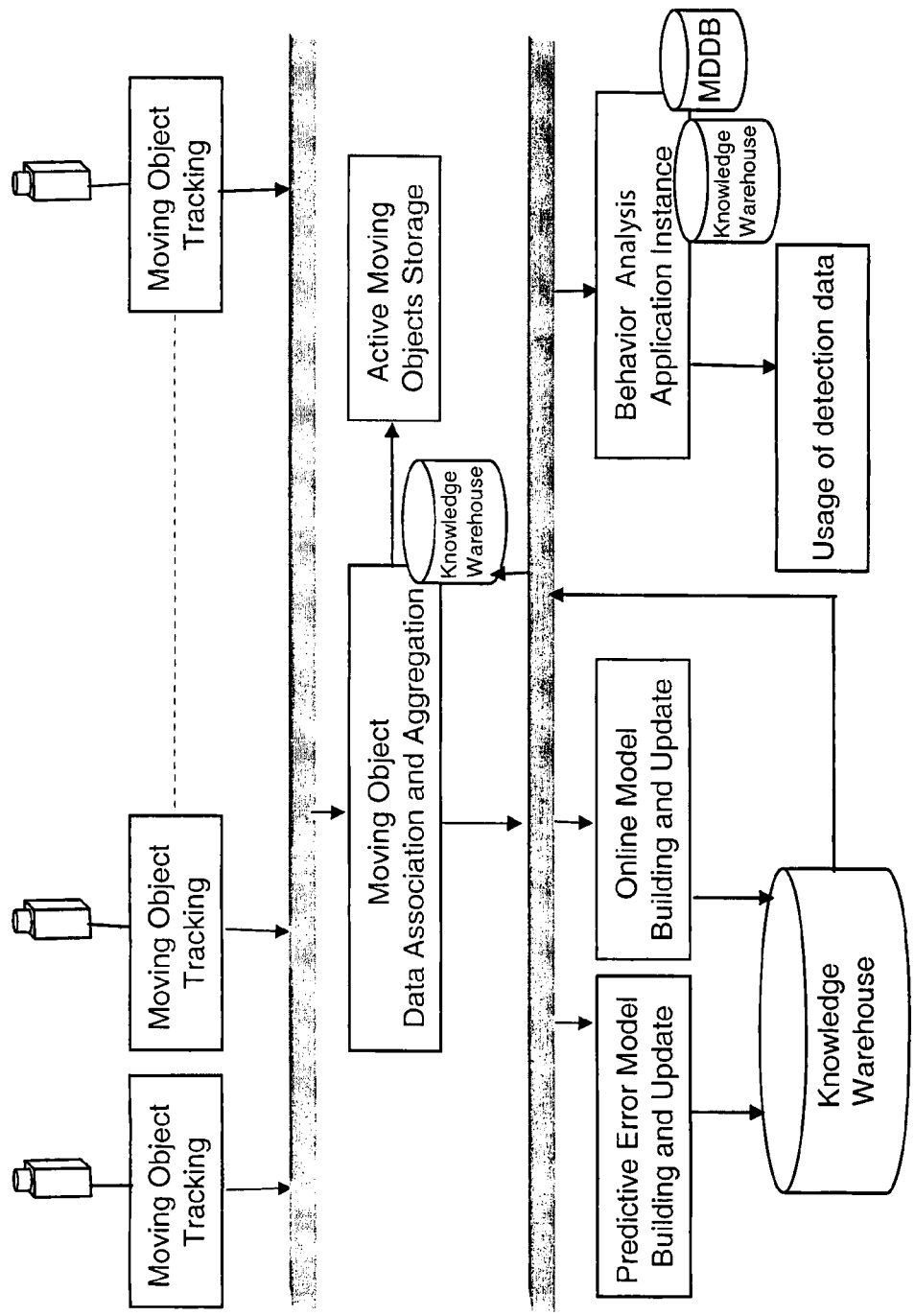
FIG. 3B is a functional block diagram illustrating a behavior assessment system having multiple cameras.

Referring now to FIG. 3B, a multi camera distributed system has multiple application contexts. These contexts share the same surveillance infrastructure for different perspectives. In this setting, Behavior Assessment Application instance fuses the evaluation of a motion object observed and scored by different cameras to assess the behavior of the motion object.

Figure 3C:
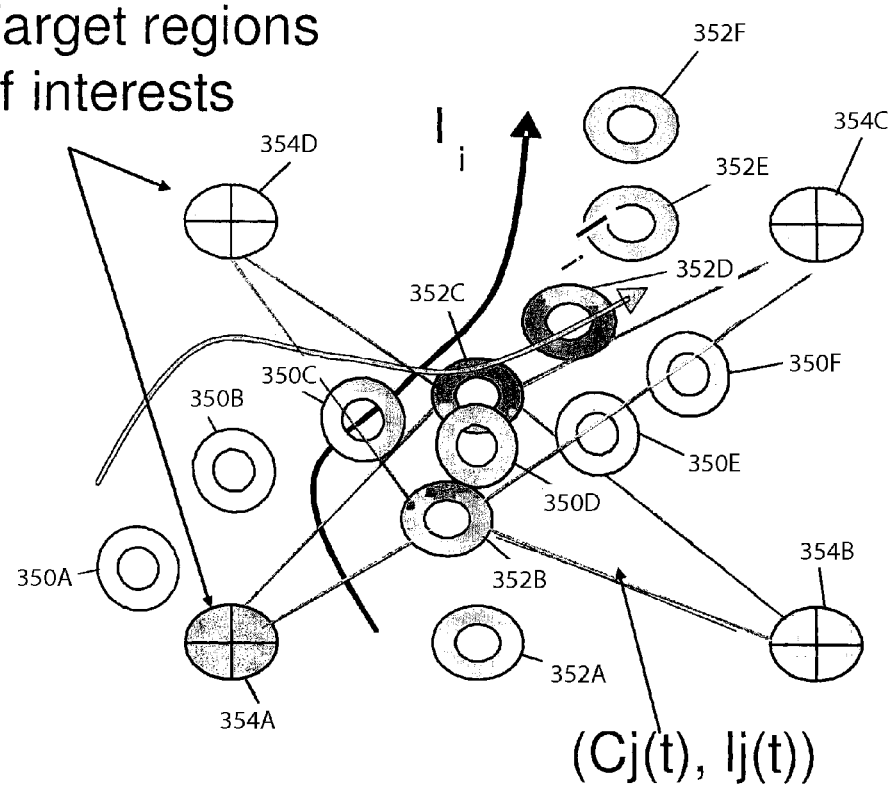
FIG. 3C is a top-down view illustrating links from samples of trajectories to targets.

Turning now to FIG. 3C, a link from a sample of a trajectory to a target region represents a pointer to the target sensitive feature set with a criticality weight $C_j(t)$. Dots 350A-350F and dots 352A-352F represent the sample points of two separate trajectories. Sample points from different trajectories have feature vectors with respect to the targets 354A-354D to reflect the significance of intention between the trajectory toward the targets. Intention is modeled as a set of scoring function against user defined statistical reference models.

Sample trajectories can have similar feature vectors because the state space is reduced to multipliers between intention and criticality vectors. In effect, it achieves feature extraction based on relationships to the targets specific to the context of the application as opposed to the topological shape and curvature of the trajectory itself within an application context.

A Real-time Video Mining Process thus begins with defining a target, j, in a physical field under surveillance. Then, a criticality vector $C_j$ is defined for each target j. Next, function models are defined to calculate the scores, location, motion, and other observable properties of the object, i, at time, t. A collection of functions is then used to represent the intention of an object toward a target j as context sensitive feature scores denoted as:

{$I_{ij}(t)$} of the motion object i with respect to target j at time of t.

The vector $S_{ij}(t)=C_j(t)*I_{ij}(t)$ is used to model the context sensitive behavior of a trajectory with respect to a set of targets. A sensor k is used to monitor the trajectory of the object against the same set of targets to obtain a set of vectors observed from k sensor. This set is denoted as a matrix $S_{ijk}=[S_{ij1}(t), S_{ij2}(t), S_{ij3}(t), \ldots, S_{ijk}(t)]$.

The probability of overall measurement error from K sensors is calculated using a predetermined set of trajectory samples to obtain the characteristic of measurement error of trajectory positions, and trajectory directions with respect to all the targets area of interests. $(P_1, P_2, \ldots P_K)$. The error distribution is ranked and used for selecting targets of interests to represent the scores of the trajectory. For example, a velocity of a horizontal trajectory with vertical vibration can be better observed from a target perpendicular to the vibration and align to the horizontal motion. Feature scores ranked by multiple targets are used to describe the behavior of a trajectory's intention toward each target at different points of time. The intention is used to decide the temporal order of intentions among a sequence of targets.

Referring now generally to FIG. 9 and FIG. 10, intention of the object motion can be represented by a set of scoring functions against a set of accumulated statistical models, Score Assessment Models (in FIG. 9, FIG. 10). For example, assume that each scoring function has ScoringFunctionID, each target has a TargetID, each observation statistical window is a TimeSlice. Then, the system calculates intention for the motion by accumulating and ranking the scores of individual sample points relative to each of the targets. The following example specifies data structure of multidimensional cubes formed by the multiple application contexts, multiple targets, multi-Scoring-function and this data structure is calculated in real-time.

{SensorID@FOVID@Application
 ID@TargetID@TimeSlice@ScoringFunctionID}→
 {$N(\mu_{tmax},\sigma_{tmax})$, $N(\mu_{tmin},\sigma_{tmin})$, $N(\mu_{tmed},\sigma_{tmed})$} where $\mu_{tmax}$=Running Average of Max(scoreOfTrajectory)
$\sigma_{tmax}$=Standard deviation of Max(scoreOfTrajectory)
$\mu_{tmin}$=Running Average of Min(scoreOfTrajectory)
$\sigma_{tmin}$=Standard deviation of Min(scoreOfTrajectory)
$\mu_{tmed}$=Running Average of Median(scoreOfTrajectory)
$\sigma_{tmed}$=Standard deviation of Median(scoreOfTrajectory)

Each cell of Score Assessment Model contains at least the following information; {$N(\mu_{tmax},\sigma_{tmax})$, $N(\mu_{tmin},\sigma_{tmin})$, $N(\mu_{tmed},\sigma_{tmed})$} where N denotes the normal distribution. The Max(scoreOfTrajectory) is calculated by taking the maximum of score values that are calculated by the same scoring engine-target pair and assigned to trajectory at every time step. The definition of Min and Median follows the same description in which the Max is replaced by Min or Median functions. The value of $\mu_{tmax}$ is obtained from so far observed trajectories. This application specific statistical scoring assessment model is used by feature extraction step to normalize the score values obtained from each intention function. When the motion object disappears from the field of view of a camera, the scores associated with the trajectory are evaluated to update Score Assessment Models. These models are dynamically calculated and stored in a Knowledge Warehouse. Alternatively, the score assessment models are stored in multidimensional indexing module (MDDB) for fast access and update of cells. The accumulative meta data cube is used to describe the trajectory in the context aware scoring functions for each (target x and scoring function y). The target and scoring function are selected to: (i) reflect application context; and (ii) reduce the observation error.

Figure 4:
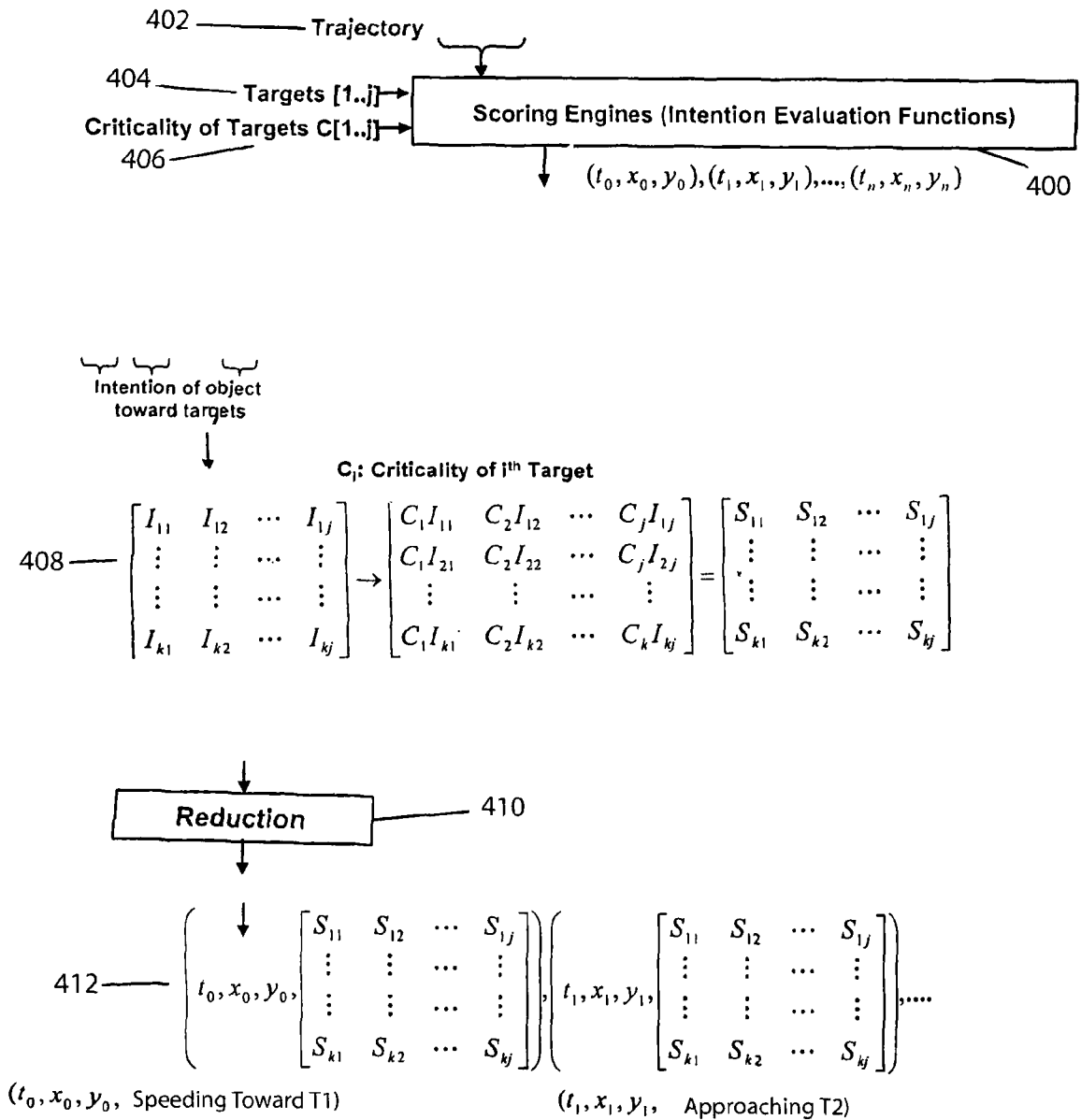
FIG. 4 is a flow diagram illustrating transformation of trajectory data into an application specific context aware representation.

Turning now to FIG. 4, scoring engines 400 receiving trajectory data 402, target region data 404 defining one or more target regions for a specific application context, and criticality data 406 indicating criticality of the target regions within the specific application context. For purposes of illustration, the trajectory data 402 is expressed as Trajectory($t_0$, $x_0,y_0$), ($t_1,x_1,y_1$), ... ($t_n,x_n,y_n$). The target region data 404 is expressed as Targets [1 ... j]. The criticality data is expressed as Criticality of Targets C[1 ... j].

Scoring engines 400 then perform feature extraction to calculate intentions 408 of moving objects toward the target regions 404. The raw score values are normalized by using the application specific statistical model of scores and transformed to intention value. A set of the intentions 408 is expressed as follows:

$$\begin{bmatrix} I_{11} & I_{12} & \ldots & I_{1j} \\ \vdots & \vdots & \ldots & \vdots \\ \vdots & \vdots & \ldots & \vdots \\ I_{k1} & I_{k2} & \ldots & I_{kj} \end{bmatrix}.$$

Criticality of $i^{th}$ target region is expressed as $C_1$. The intention evaluation process then occurs according to:

$$\begin{bmatrix} I_{11} & I_{12} & \ldots & I_{1j} \\ \vdots & \vdots & \ldots & \vdots \\ \vdots & \vdots & \ldots & \vdots \\ I_{k1} & I_{k2} & \ldots & I_{kj} \end{bmatrix} \rightarrow \begin{bmatrix} C_1 I_{11} & C_2 I_{12} & \ldots & C_f I_{1j} \\ C_1 I_{21} & C_2 I_{22} & \ldots & C_f I_{2j} \\ \vdots & \vdots & \ldots & \vdots \\ C_1 I_{k1} & C_2 I_{k2} & \ldots & C_k I_{kj} \end{bmatrix} = \begin{bmatrix} S_{11} & S_{12} & \ldots & S_{1j} \\ \vdots & \vdots & \ldots & \vdots \\ \vdots & \vdots & \ldots & \vdots \\ S_{k1} & S_{k2} & \ldots & S_{kj} \end{bmatrix}$$

$$\downarrow$$

$$\left( t_0, x_0, y_0, \begin{bmatrix} S_{11} & S_{12} & \ldots & S_{1j} \\ \vdots & \vdots & \ldots & \vdots \\ \vdots & \vdots & \ldots & \vdots \\ S_{k1} & S_{k2} & \ldots & S_{kj} \end{bmatrix} \right), \left( t_1, x_1, y_1, \begin{bmatrix} S_{11} & S_{12} & \ldots & S_{1j} \\ \vdots & \vdots & \ldots & \vdots \\ \vdots & \vdots & \ldots & \vdots \\ S_{k1} & S_{k2} & \ldots & S_{kj} \end{bmatrix} \right) \ldots$$

Reduction module 410 next reduces the intention evaluations to obtain alert intentions 412 that meet the criteria for issuing alerts as follows:

$(t_0, x_0, y_0, \langle SemanticBehaviorLabel, Target \rangle),$ $(t_1, x_1, y_1, \langle SemanticBehaviorLabel, Target \rangle), \ldots$ $\downarrow$ $(t_0, x_0, y_0, Speeding\ TowardT1), (t_1, x_1, y_1, ApproachingT2), \ldots$ where $SemanticBehaviorLabel = GetSELabel\left(AppID, \underset{i}{\mathrm{argmax}}\{a_{ij}\}\right)$ $Target = GetTargetLabel\left(AppID, \underset{j}{\mathrm{argmax}}\{a_{ij}\}\right)$ The GetSELabel function obtains the semantic behavior label by using the application identifier and scoring function identifier. Thus, the application specific semantic event label is obtained. This mechanism enables system to interpret the same motion trajectory with different semantic events depending on the application context.

Figure 5:
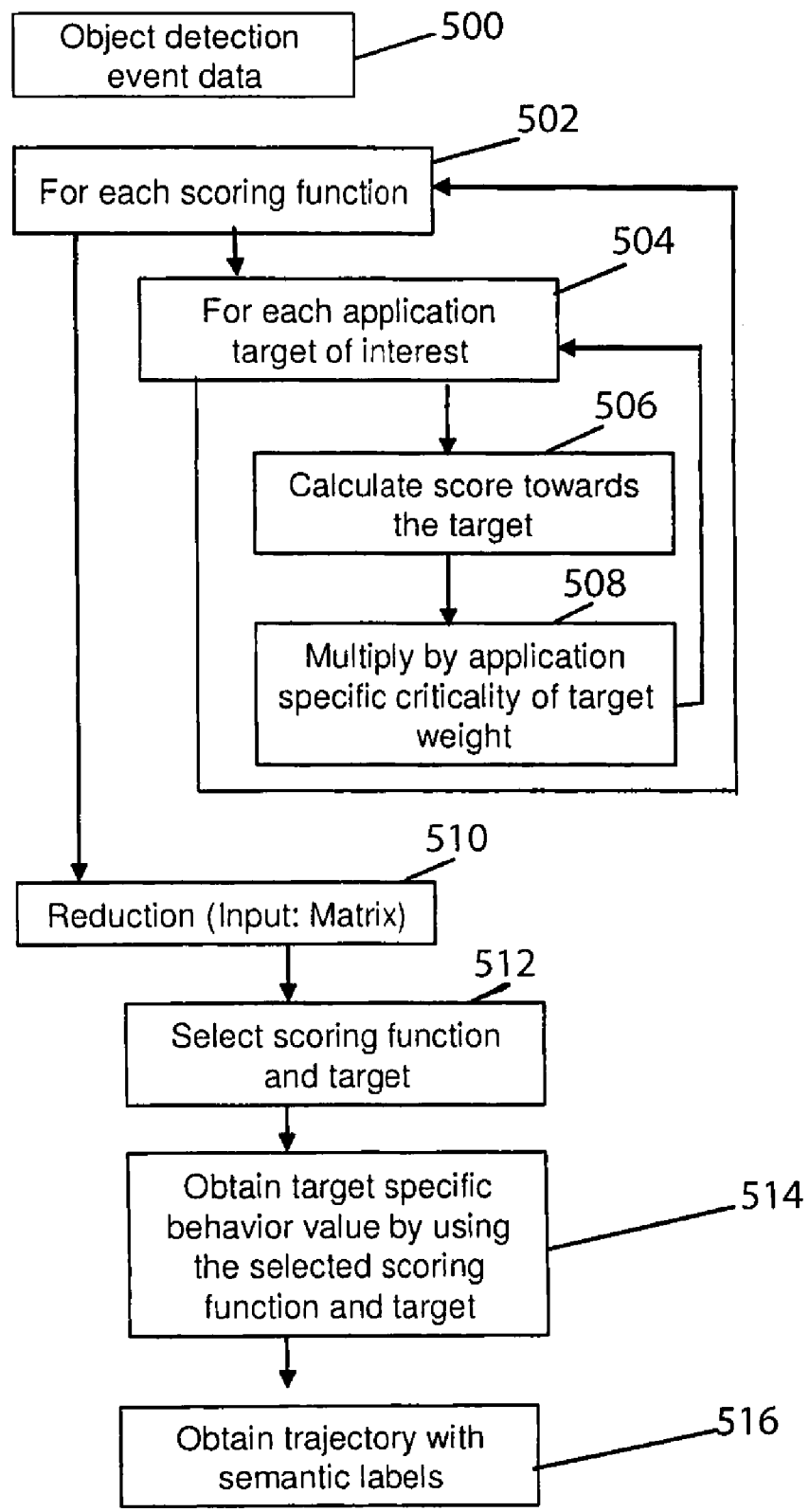
FIG. 5 is a flow diagram illustrating trajectory data transformation.

Turning now to FIG. 5, the trajectory data information flow proceeds by operating on object detection event data 500. For each scoring function as at switch step 502, and for each application target of interest as at switch step 404, the score towards the target is calculated at step 506. The score is multiplied by application specific criticality of target region weights at step 508. This iterative process produces an intent matrix.

Reduction process step 510 then operates on the intent matrix by selecting a scoring function and a target region at step 512. A target region specific behavior value is then obtained at step 514 by using the selected scoring function and target region. Finally, a trajectory is obtained with semantic labels at step 516.

Figures 6, 7:
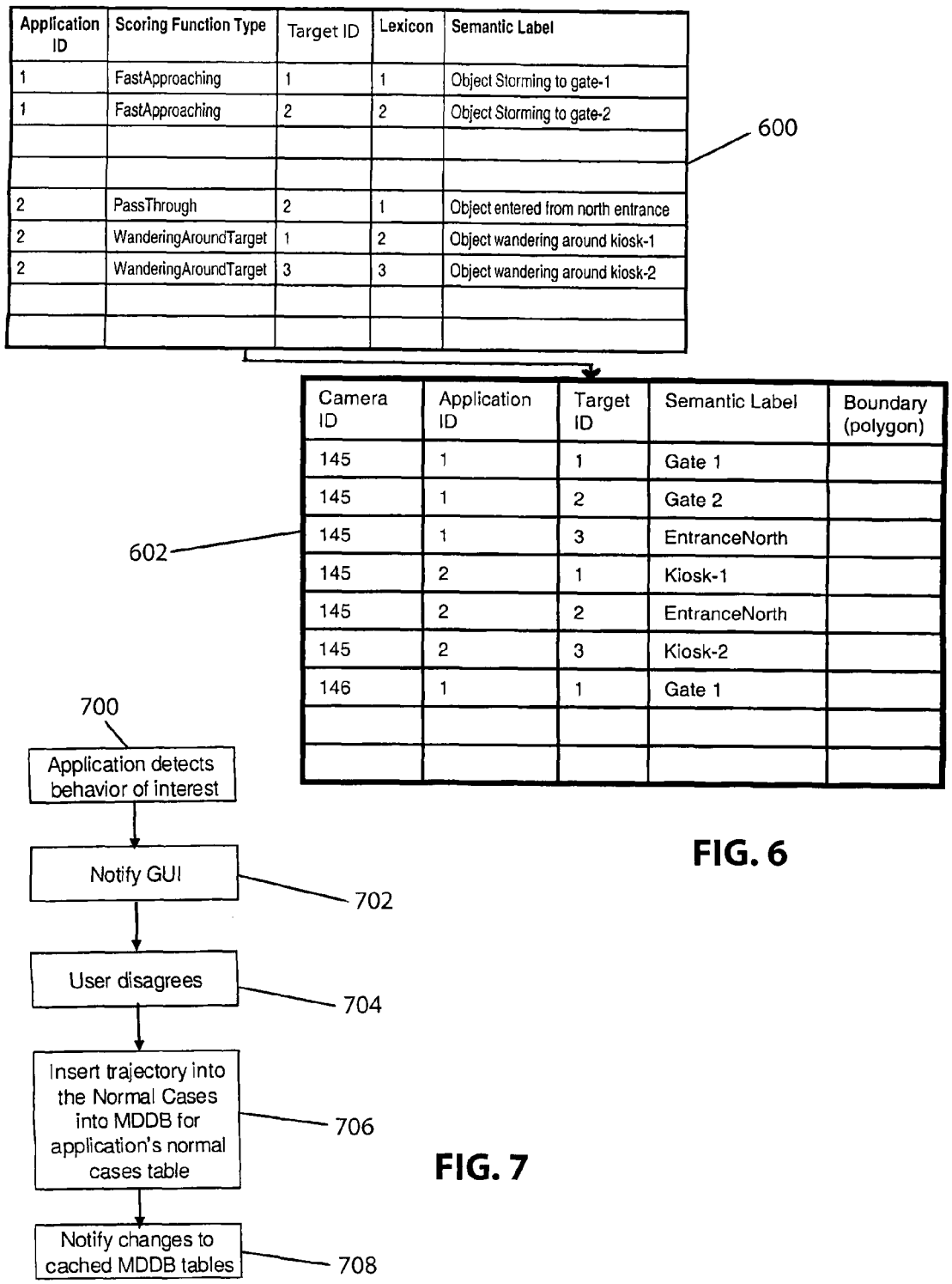
FIG. 6 is a graphical representation of an application ontology definition.
FIG. 7 is a flow diagram illustrating collection of user feedback.

Turning now to FIG. 6, the semantic labels are retrieved from set of application specific event descriptions, including tables 600 and 602. Some of the semantic labels, retrieved from table 600, are retrieved by application ID, scoring function type (e.g., "Fast Approaching," "Pass Through," or "Wandering Around Target"), Target ID, and Lexicon. These semantic labels indicate a situation for the alert (e.g., "Object Storming Gate," "Object Entering from North Entrance," "Object Wandering Around Kiosk," etc.). Additional semantic labels are retrieved from table 602 for specific cameras, applications, and target regions. These semantic labels indicate the target region (e.g., "Gate 1," "Gate 2," "North Entrance," "Kiosk-1," "Kiosk-2," etc.).

An advantage of abnormality intention assessment is that it can provide more than intuitive output to multiple types of application users such as marketing, safety and security personnel. It also can provide an intuitive forensic indexing scheme that supports multiple perspectives and views for different applications. For example, consider two trajectories with target-intention sequences:
[Intention-1, Obj-1, Gate-1-FastApproahching, 0.7, t1, (x1, y1)], [Intention-2, obj 2, TradeshowBooth-Loitering, 0.9, t2, (x2,y2)], [Intention-3, Obj 1 Gate 2-FastApproaching, 0.95, t3, (x3,y3)]
For a security guard application, it is more effective to investigate abnormality Intention-3 of assessment score 0.95 before investigating abnormality intention-1 of the assessment 0.7. A marketing department, however, might be more interested in looking at Intention-2 to find out why the object stays around the booth for a greater amount of time than usual. Furthermore, the application specific event hierarchies can be defined by using the sequence of application specific high level event labels. These composite events can be used for real-time notification to the behavior assessment dashboard and offline data analysis for generating various reports, such as application specific behavior activity reports presenting the frequency of these behaviors for the particular application.

Behavior patterns are filtered by employing user's feedback. The user's feedback is collected in MDDB to collect the behavior patterns to be filtered during the behavior detection software modules. The system uses the alarm acknowledgement to collect this data. MDDB provides fast access to data indexed by multidimensional vectors. The similarity search and range query search operations are realized efficiently compared to the relational databases.

Turning now to FIG. 7, the process of alerting based on the detected intentions occurs by the application detecting a behavior of interest at step 700. The GUI is then notified at step 702. If the user disagrees at step 704, then the trajectory in question is inserted into the metadata database as a false positive case for that application at step 706 Changes to the cached meta data data base are then notified to subscribers at step 708.

Each target region is associated with an influence field. Any relationship between the target region and a moving object is only measured (exists) when an object in motion is within this influence (attraction) field. The strength of relationship depends on the closeness of the object from the target region 800. The further away a moving object is, the weaker the relationship.

The purpose of building a tracking error model for a field of view of a camera is two fold. The first objective is to understand the spatio-temporal tracking errors within the single camera field of view and compensate for behavior detection. For example, in case of suspicious behavior detection, the abnormality score is reduced if the error is high. The second objective is to decide which camera's measurement of attributes of the object to select. For example, when a speed attribute of an object is produced by more than one camera, the data association component selects the one with least expected error. Assuming an object has time stamped a set of vectors for each (multi dimensional time series data) observation, the attribute values can come from different cameras. Since the selection is based on the selection of least expected error, the accuracy of behavior detection is better. These tracking error models of each field of view of camera are stored in a knowledge warehouse.

For each camera field of view, a randomly sampled trajectory data is used to estimate the observed error (measurement error) within the influence field of each target region. The measurement error is associated with the location (position) and direction properties of objects (tracked foreground region). The error is estimated as a multidimensional data cube in which error$[T_i][t][x][y]=[N(\mu_e^P,\sigma_e^P),N(\mu_e^d,\sigma_e^d)]$ where $N(\mu_e^P,\sigma_e^P)$ denotes the observed position estimation error for target Ti for spatio-temporal region (t,x,y), respectively, $N(\mu_e^d,\sigma_e^d)$ denotes the observed position estimation error for target Ti for spatio-temporal region (t,x,y). The position and direction error is calculated by using the residual error between the predicted position and observed position, the predicted direction and observed direction. The prediction can be implemented by many different methods such as Kalman Filter (EKF, Uncented KF, etc. with using Position Velocity and Acceleration; PVA model), or double exponential filter.

The time dimension captures the variations during the day. For example, 30 minutes intervals for a 24 hour day results in 48 dimensions on a time axis. Similarly, variable length intervals are used by utilizing an amount of observed activity within 24 hours obtained from historical data. The error[$T_i$][t][x][y] of target Ti is only calculated for influence area of target Ti.

Let $IR(T_i)=\{(x_i,y_i,s_i),\ldots\}$ denote the set of points in which location $(x_i,y_i)$ denotes the location and $s_i$ denotes the strength. If $(x,y) \in IR(T_i)$, then error[$T_i$][t][x][y] needs to be calculated.

```
For each trajectory Ti from sample set
  For t=1:n
    For each application
      For each target in application.targets
        If Ti(t).(x,y) in application.targets.IR
          residual_pos=GetPosResidual(T[1..(t-1)],t,x,y);
          residual_dir=GetDirResidual(T[1..(t-1)],t,x,y);
          Update error[Ti][tidx][x][y] by residual_pos
          Update error[Ti][tidx][x][y] by residual_pos
        Endif
      EndFor
    EndFor
  EndFor
EndFor
```

Tracking error models of each field of view of cameras are stored in Knowledge Warehouse. Alternatively, the tracking error models of cameras can be stored in multidimensional indexing module for fast access and update of cells There are a number of GUIs employed by users to define the target regions. For example, cameras are placed high above, even directly above, an observed region, and are pointed downwards to capture the area substantially from directly above. Users then encircle or otherwise indicate the target regions, and trajectories of moving objects towards or away from the target regions are easily determined. Also, captured images from cameras having overlapping fields of view and/or adjacent fields of view are cropped, projected onto a hemisphere, and stitched together to provide a virtual overhead view. Another GUI, an example of which is explained below, operates with a camera that is not placed very high above the observed area, such as due to a low ceiling.

For a perspective view, determining whether a moving object is in front of or behind an object is more problematic than with an overhead view. A horizon and scale of the field of view are predefined in order to interpret the movement of the moving objects along paths in a 3D environment, such as a floor, ceiling, or stair. Presuming that moving objects move along the floor or ground, users successfully specify a point of interest by clicking on the ground at the point of interest. For other paths, such as stairs or rails, users click on the stairs or rails along which the moving object must approach the point of interest in order to specify the points of interest.

In some embodiments, a 2D shape of the target region (e.g., polygon, ellipse) is controlled to appear to lie in a plane that is parallel to and intersects the known horizon. The horizon passes through a vanishing point at the center of the field of view. The horizon is dynamically determined from pan, tilt, and zoom of the camera, predefined by users, or otherwise determined. Users specify for each target region whether the target region is bottom up (e.g., on floor or stair) or top down (e.g., on ceiling). The system executes in the 3D environment to assess whether a moving object is in front of or behind the target region.

For example, consider the case in which the target region lies in a plane that extends from the horizon downwards toward the viewer in the field of view, and the user specifies that the target is bottom up (e.g., path is on the ground). Since the target is bottom up, a bottom of a moving object is observed for that target. Here, it is determined that if the bottom of the moving object is above a center of the target region in the field of view, then the moving object is behind the target region. But if the bottom of the moving object is below a center of the target region in the field of view, then it is determined that the moving object is in front of the target region.

Also consider another case in which the target region is drawn to lie in a plane extending upward from the horizon toward the viewer in the field of view, and the user has specified that the target is top down (e.g., path is on the ceiling). Since the target is top down, a top of the moving object is observed for that target. Here, it is determined that if the top of the moving object is above a center of the target region in the field of view, then the moving object is in front of the target region. But if the top of the moving object is below the center of the target region in the field of view, then it is determined that the moving object is behind the target region.

Further, consider the case in which the target region is drawn to lie in a plane extending upward from the horizon toward the viewer in the field of view, and the user has specified that the target is bottom up (e.g., path is on a stair higher above the ground than the camera). Since the target is bottom up, a bottom of the moving object is observed for that target. Here, it is determined that if the bottom of the moving object is above a center of the target region in the field of view, then the moving object is in front of the target region. But if the bottom of the moving object is below the center of the target region in the field of view, then it is determined that the moving object is behind the target region.

With the depth position of the moving object relative to the target region known, the system determines whether the moving object moves toward the object or away from the object as the moving object grows larger or smaller. For example, if the moving object is behind a target region and growing smaller, then the moving object is determined to be moving away from the target region in a depth dimension of the plane in which the target region lies. But if the moving object is in front of the moving object and growing smaller, then the moving object is determined to be moving toward the target region in the depth dimension of the plane in which the target region lies. Similarly, if the moving object is growing larger, and if it is in front of the target region, then it is determined to be moving away from the target region. And if the moving object is growing larger, and if it is behind the target region, then it is determined to be approaching the target region from behind.

Determining a depth direction of movement of a moving object is problematic in the case of a stationary object that occludes the view of the moving object. This circumstance occurs in the case that the moving object is behind the moving object. This problem is resolved by strategically employing multiple cameras to observe the target region from various angles.

The system determines whether the moving object is to the left or right of the target region with reference to a line that passes through a center of the target region to the vanishing point. If a center of the moving object is to the left of this line, then it is to the left of the target region in the plane in which the target region lies. If the center of the moving object is to the right of this line, then it is to the right of the target region in the plane in which the target region lies.

Degrees of distance in the depth direction and the horizontal direction of the plane are determined by a predefined. This scale accurately measures the distance with respect to lines in the plane that pass though the vanishing point and lines that are parallel to the horizon and lie within the plane. This scale and the position of the target region in the depth direction of the plane automatically adjust for camera zoom. The position of the target region in the horizontal direction of the plane adjusts automatically for camera pan. The horizon (and thus the plane and the target region) adjusts automatically for camera tilt. Accordingly, the position of the moving object in the plane with respect to the target region is reliably determined. The speed of the moving object is also determined with accuracy.

Employing one or more of the GUIs described above, users provide criteria for measuring user intent. These criteria include thresholds, weights, and types of intent parameters to observe for generating alarms. In some embodiments, users specify these parameters by selecting display properties for the target regions. For example, users select to display a target region as red to impart a higher weight to that region's sensitivity. Also, users specify distance thresholds for target regions by selecting a target region and clicking on the image to designate the threshold, such as by drawing an ellipse or polygon around the target region. Employing the 3D environment GUI described above, this ellipse or polygon is constrained to lie in the same plane as the target region, and to completely enclose the target region. Employing one or more of the GUIs described above, users choose the size of the shape and place it off center if desired.

Users drag and drop predefined icons onto the regions to specify the criteria for alerting on target intent. The criteria that users specify include being near a target region and/or approaching a target region. Additional criteria include wandering near a target region, wandering toward a target region, speeding near a target region, speeding toward a target region, speedily wandering near a target region, speedily wandering toward a target region, etc. Users also specify weights for alerting on the criteria, and these weights are specific to target regions on an individual basis. In other words, different target regions in the field of view can have the same criteria but different weights for those criteria. At will, users specify more than one criteria for a target region, and weight these criteria individually.

Figure 11:
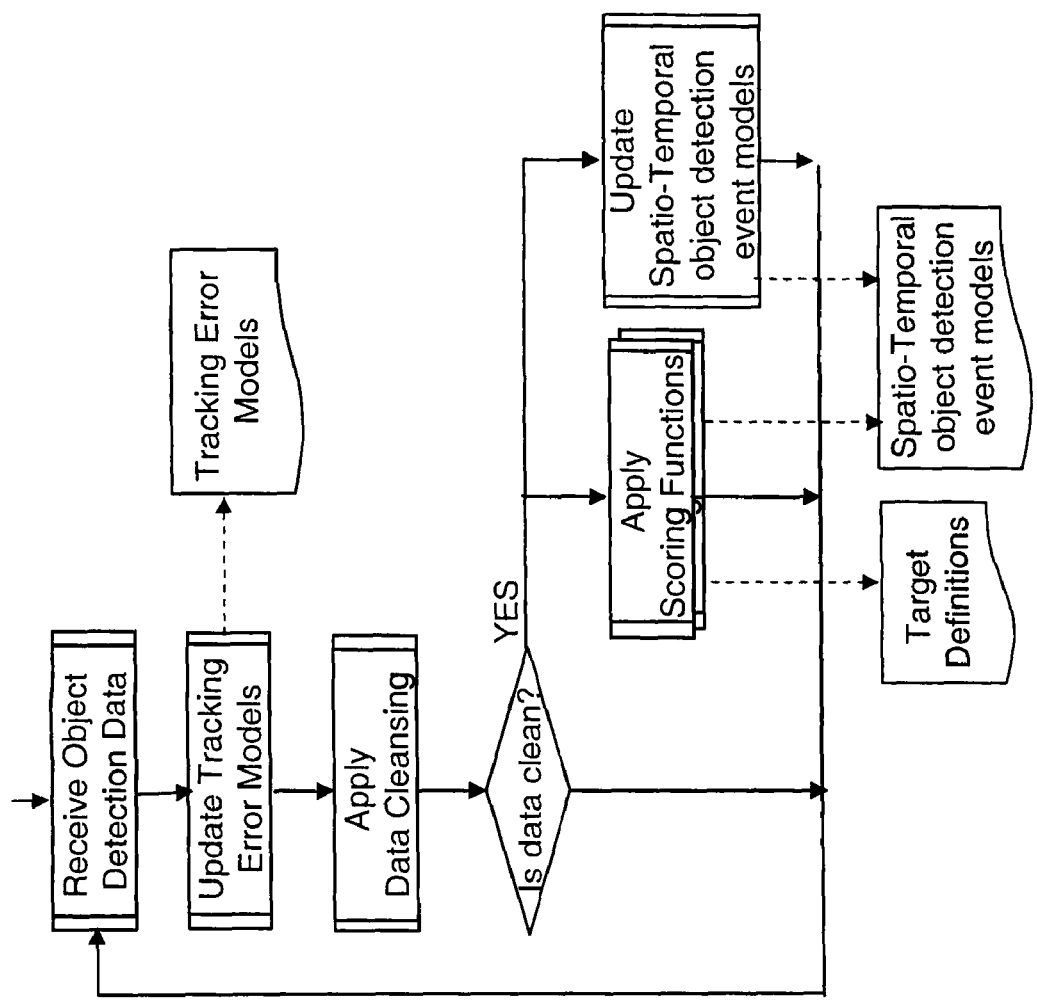
FIG. 11 is a flow diagram illustrating a scoring process executed by a scoring engine.
Figure 12:
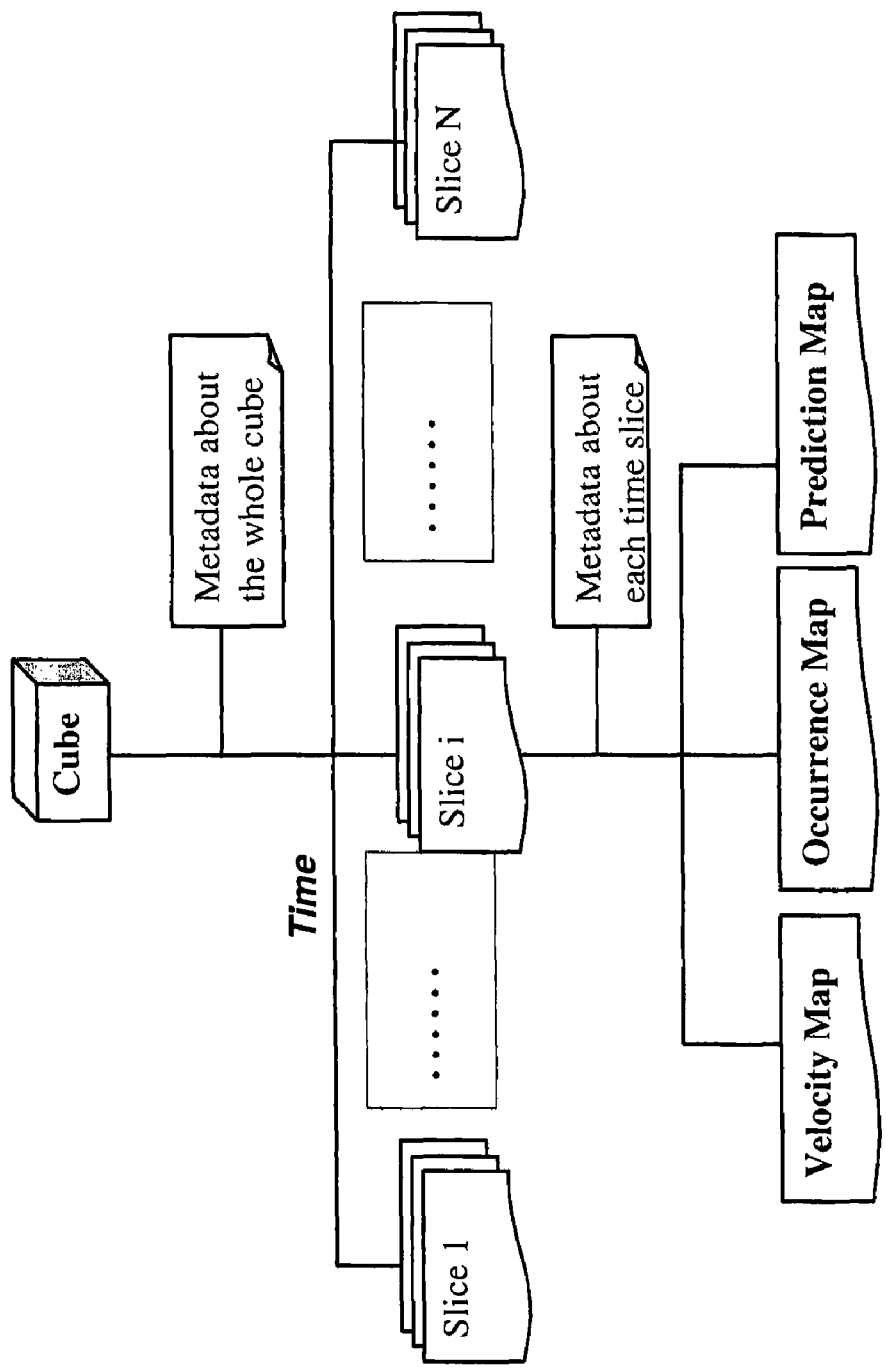
FIG. 12 is a block diagram illustrating a data model.

Spatio-temporal models of object detection events are summarized into multidimensional cubes based on the object detection events collected from field of view of camera. Each model cube has two parts: the metadata about the whole cube and a series of cube slices based on different time interval specification. Each slice contains: the metadata about the slice, such as the timing specification and statistical models extracted from motion objects such as Velocity Map and Occurrence Map, each slice is extensible to include other maps. FIG. 11 depicts the structure of spatio-temporal models. Spatio-temporal models of object detection events of each field of view of cameras are dynamically calculated abd stored in Knowledge Warehouse. Alternatively, spatio-temporal models of object detection events of cameras can be stored in multidimensional indexing module for fast access and update of cells Turning to FIG. 11, the Metadata of a spatio-temporal model cube contains the following attributes;

| Field | Type | Description |
| --- | --- | --- |
| CameraID | INT32 | The camera identifier |
| FOVID | INT32 | The camera FOV Identifier |
| RowSize | INT32 | Camera resolution for row |
| ColSize | INT32 | Camera resolution for column |
| RowGridSize | INT32 | Number of pixels of each grid on row |
| ColGridSize | INT32 | Number of pixels of each grid on column |
| RowGridNum | INT32 | Number of cells on image row |
| ColGridNum | INT32 | Number of cells for each image column |
| TotalSliceNum | INT32 | The total slice number for the cube |
| DirectionSize | INT32 | While building velocity maps for each slice, how many direction kernels will be used. |
| MovingWindowSize | INT32 | Using last K point moving average velocity as the current velocity to smooth out the velocity value. |

The metadata about each slice of spatio-temporal cube contains the following attributes;

| | Field | Type | Description |
| --- | --- | --- | --- |
| TimeSpec | DayOfMonthSize | INT32 | How many ranges to specify the day of month |
| | DayOfMonth | Array | An array of integers to specify number of "DayOfMonthSize" pairs of range. For example [1 31] is one pair. [1 1 15 15] has two pairs. |
| | DayOfWeekSize | INT32 | How many ranges to specify the day of week |
| | DayOfWeek | Array | An array of integers to specify number of "DayOfWeekSize" pairs of range. For example [1 7] is one pair. [1 1 5 5] has two pairs. |
| | HourOfDaySize | INT32 | How many ranges to specify the hour of day |
| | HourOfDay | Array | An array of integers to specify number of "HourOfDaySize" pairs of range. For example [0 23] is one pair. [8 8 18 18] has two pairs. |
| | MinuteOfHourSize | INT32 | How many ranges to specify the minute of hour |

| Field | Type | Description |
|---|---|---|
| MinuteOfHour | Array | An array of integers to specify number of "MinuteOfHourSize" pairs of range. For example [0 59] is one pair. [0 1 30 31] has two pairs. |
| AvgTrackLen | double | The average trajectory duration in this FOV |
| StdTrackLen | double | The standard deviation on the trajectory length |
| TrackCount | INT32 | The number of trajectory used to build this slice. |

Each velocity map in a slice of spatio-temporal model is a multidimensional data structure with the following dimensions;

RowIndex: from 1 to the RowGridNum in the metadata about cube.

ColumnIndex: from 1 to the ColGridNum in the metadata about cube.

DirectionID: from 1 to the DirectionSize in the metadata about cube plus 1. The ID DirectionSize+1 for non-moving points, means no-moving direction.

FeatureIndex:

```
VEL_AVG_X = 1;    Average velocity on X direction
VEL_AVG_Y = 2;    Average velocity on Y direction
VEL_STD_X = 3;    Standard deviation on X direction velocity
VEL_STD_Y = 4;    Standard deviation on Y direction velocity
VEL_COUNT = 5;    Total Activity count
VEL_PROB = 6;     The probability distribution for each direction.
```

Figure 13:
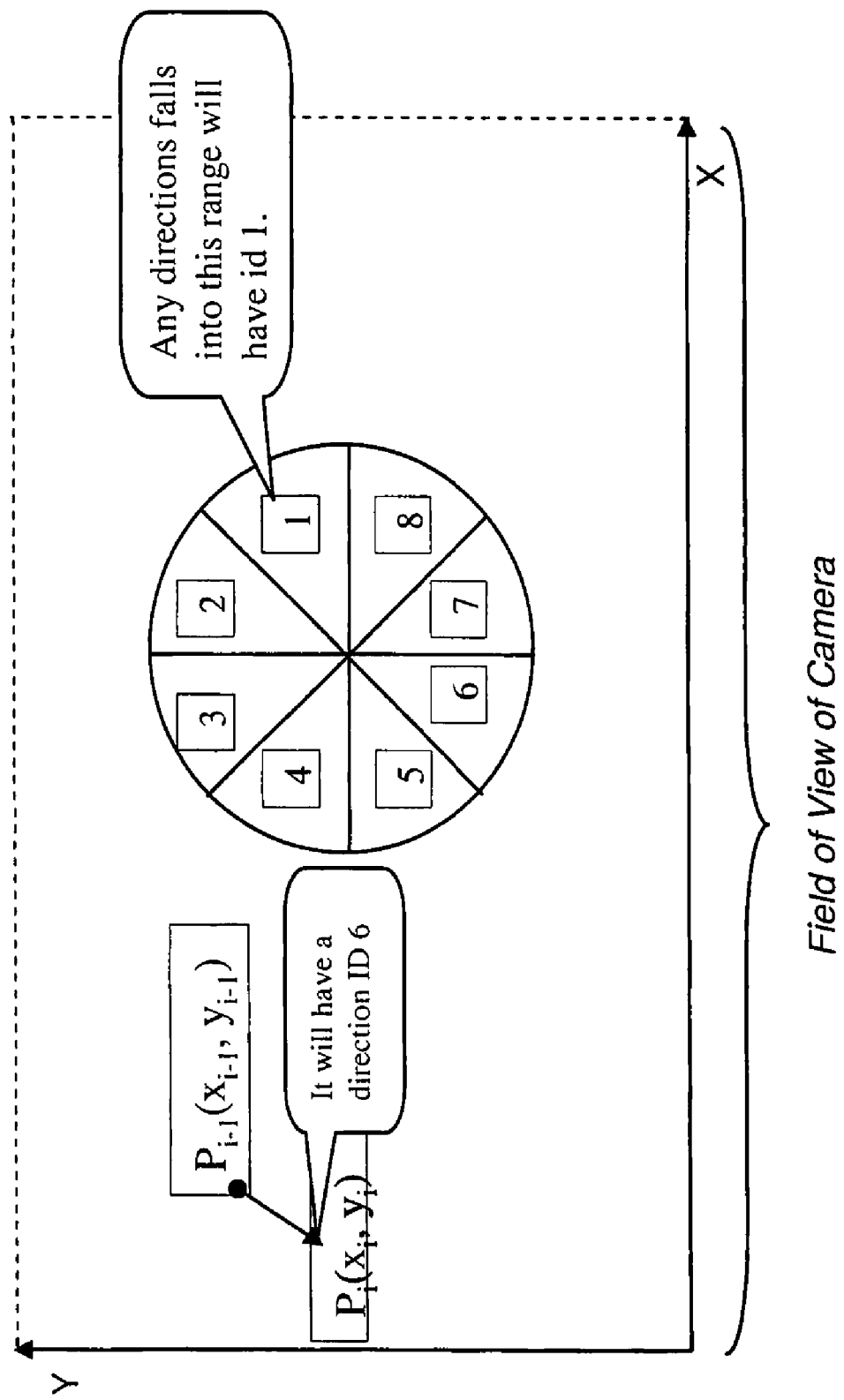
FIG. 13 is a graphical representation illustrating a direction ID.

The FIG. 13 depicts the calculation of DirectionID attribute for moving object data.

Each Occurrence Map in a slice of spatio-temporal model is a multidimensional data structure with the following dimensions:

RowIndex: from 1 to the RowGridNum in the metadata about cube.

ColumnIndex: from 1 to the ColGridNum in the metadata about cube.

FeatureIndex:
OCC_DIM_SIZE=16;
OCC_COUNT=1;
OCC_PROB=2;
MBB_WIDTH_AVG=3;
MBB_WIDTH_STD=4;
MBB_HEIGHT_AVG=5;
MBB_HEIGHT_STD=6;
BLOB_SIZE_AVG=7;
BLOB_SIZE_STD=8;
BLOB_MBB_RATIO_AVG=9;
BLOB_MBB_RATIO_STD=10;
SPEED_COUNT=11;
SPEED_AVG=12;
SPEED_STD=13;
ACCE_COUNT=14;
ACCE_AVG=15;
ACCE_STD=16;

Each feature attribute summarize the different attribute measurements obtained from motion object data. Some attributes, such as bob size and minimum bounding box width, are directly obtained from object detection event. Some attributes, such as speed and velocity, are obtained by sequence of object detection events.

The data structure of prediction map in a slice of spatio-temporal model is exactly the same as velocity map. The distinction is the velocity calculation method. The velocity in the velocity map is based on the last K points in which K is MovingWindowSize attribute in the metadata of spatio-temporal multidimensional cube. The velocity in the prediction map is based on the next K points.

Turning now to FIG. 10, the Scoring engines catalog stores the available scoring engine implementations in the system. Each scoring engine algorithm implementation in library form is kept by the system. The Scoring Engines Catalog keeps metadata about these scoring engines implementations and this is used to introduce new scoring engines to the system depending on the application requirements. Thus the system supports the extensibility of scoring engines.

Some example intention evaluation functions are supplied below.

| Intention Evaluation Function | Descriptions |
|---|---|
| Approaching | Object moves toward the target (direction-wise) and close to the target (distance-wise). |
| Wandering | Object moves around in the field of view of camera longer than average object movement in this field of view of camera. |
| Speeding | Object moves faster than average object in the same field of view of camera. |
| Wrong direction | Object moves different direction against most dominant direction of most objects at the same location. |
| Fast Approaching | Object approaching to the target, and object moves faster than average. |
| Wandering around targets | Object wandering, and object is close the target. |
| Speeding around targets | Object speeding, and object is close to the target. |

Figure 8A:
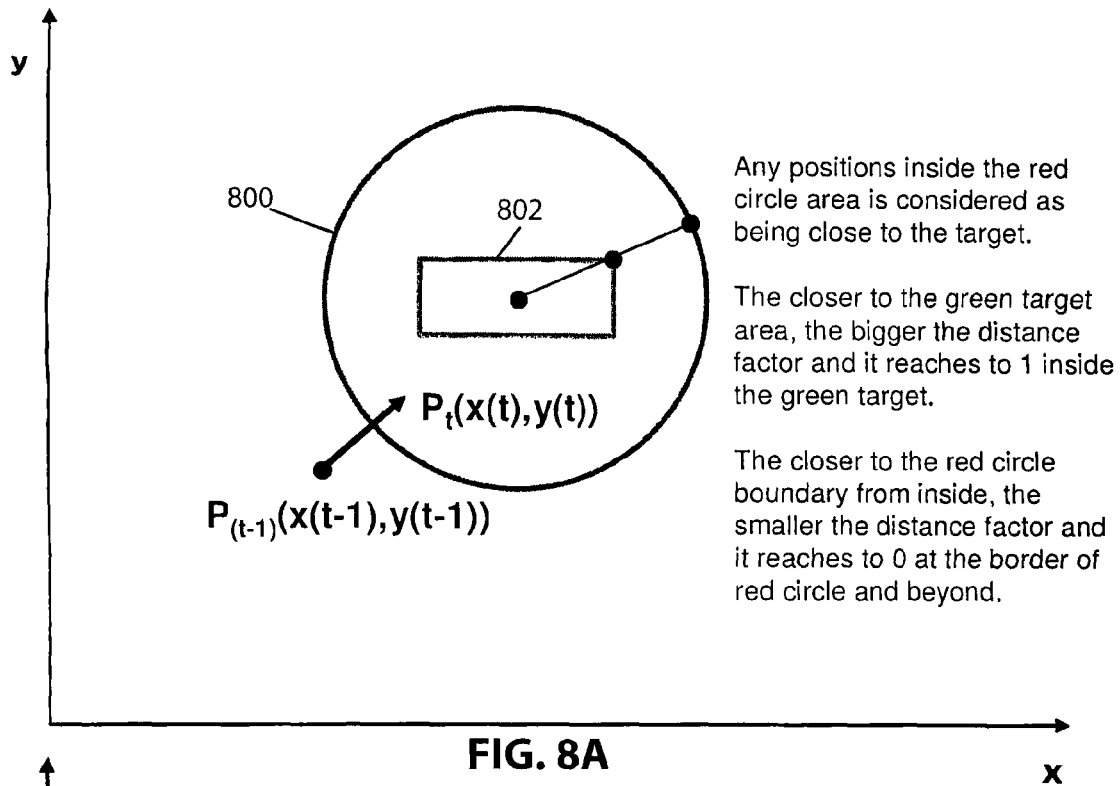
FIG. 8A is a graphical representation illustrating determination of an object approaching a target, including determining a distance factor.

Turning now to FIG. 8A, a near function is implemented by employing a user defined distance threshold 800 for a target region 802. Any positions inside the threshold 800 are considered as being near the target region 802. A distance factor increases the closer the moving object is to the target region. The distance factor reaches 1 when the moving object is inside the target region. The distance factor reaches 0 when the moving object is outside the distance threshold. Thus, the distance factor is normalized for the distance between the threshold and the target region.

The distance factor is calculated as follows: MAX_THRESHOLD_DISTANCE is a configuration parameter, default value is 2.

$$ThresholdDistance = diagnalLengthOfTarget \times \text{MAX\_THRESHOLD\_DISTANCE}$$

$$DistanceFactor = \begin{cases} 0, & \text{if } distanceToTarget \geq \text{MAX\_THRESHOLD\_DISTANCE} \\ 1 - \dfrac{distanceToTarget}{\text{MAX\_THRESHOLD\_DISTANCE}}, & \text{anything else} \end{cases}$$

Figure 8B:
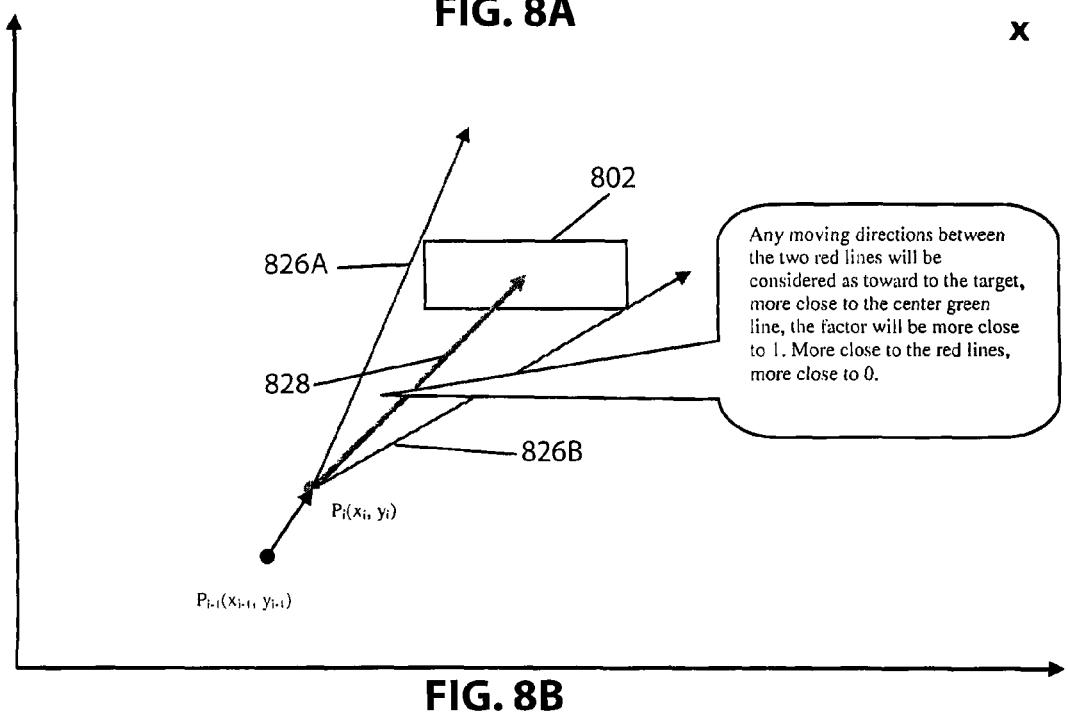
FIG. 8B is a graphical representation illustrating determination of an object, including determination of a direction factor parameter.

Turning now to FIG. 8B, a direction factor is calculated in part by determining vectors from the moving object tangent to the target region on either side. Then, if the directional vector of the moving object is between these two peripheral thresholds 826A and 826B, a determination is made that the moving object is approaching the target region 802. A center vector between the two peripheral thresholds 826A and 826B is employed as a direct threshold 828. As the directional vector of the moving object approaches the direct threshold 828, the direction factor approaches 1. As the directional vector of the moving object approaches the peripheral thresholds 826A and 826B, the direction factor approaches 0.

The direction factor is calculated as follows:
MovingDirectionAngle=joint angle between current moving direction and the direction from current point to the center of target.
ThresholdAngle=joint angle between two directions from current point to the two vertex of the target.

$$directionFactor = \begin{cases} 0, & \text{if } movingDirectionAngle > ThresholdAngle/2 \\ 1, & \text{if } movingDirectionAngle < ThresholdAngle/4 \\ 1 - \dfrac{(movingDirectionAngle - ThresholdAngle/4)}{ThresholdAngle \times 2}, & \text{otherwise} \end{cases}$$

An approaching function score is then calculated as follows:

score=distanceFactor×directionFactor.

Figure 8C:
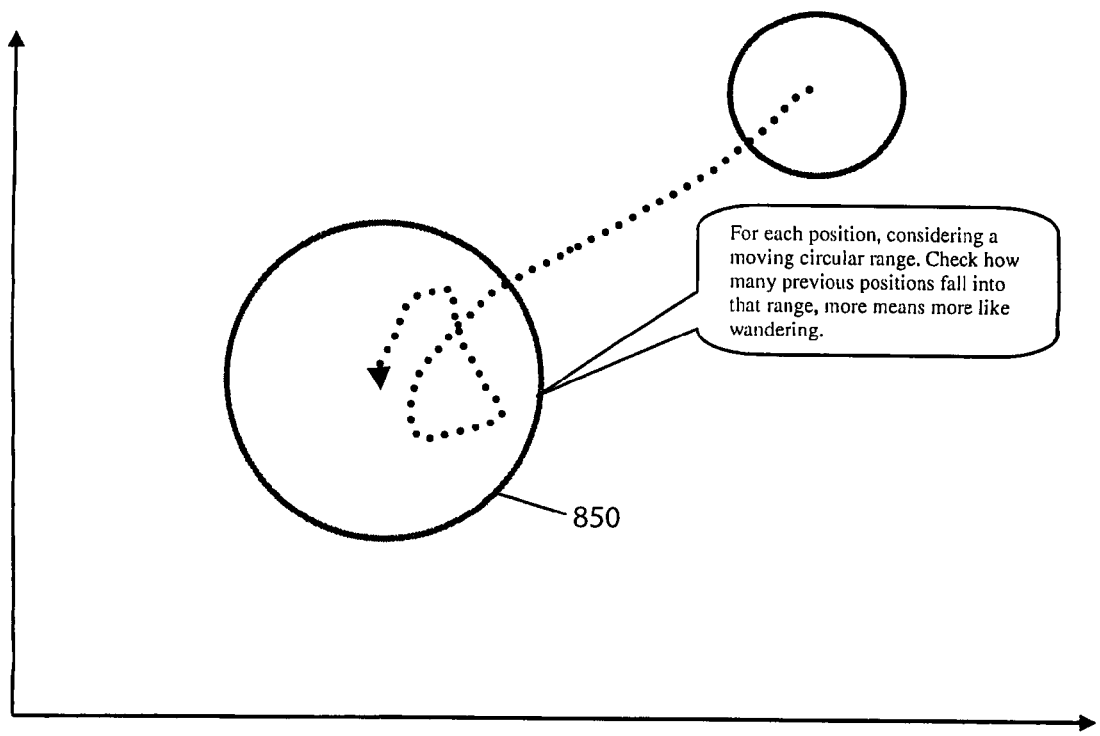
FIG. 8C is a graphical representation illustrating determination of a wandering behavior of an object.

Turning now to FIG. 8C, a wandering function score is calculated by considering, for each position, a moving circular range 850. The range is determined based on average speed of the moving object at the position. A determination is then made regarding how many previous positions fall into the range. A trajectory evaluation is performed in part by summing the average trajectory length and its standard deviation. A wandering factor is calculated as a ratio of the number of previous positions and the trajectory evaluation. This calculation is performed as follows:

K=(AverageTrajectoryLength+TrajectoryLengthStandardDeviation/2)/4;

RadiusOfTheMovingCircle=AverageSpeedAtCurrentPosition*K/5;
Count=The position number of current trajectory falls in the circular range of current position.

Figure 8D:
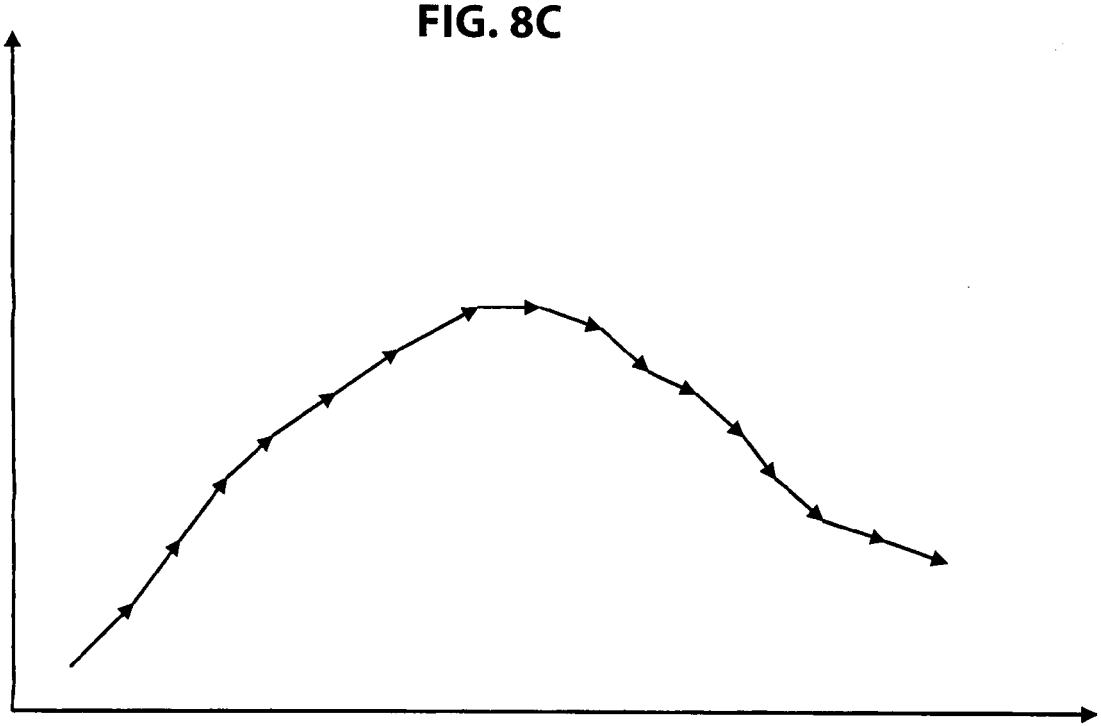
FIG. 8D is a graphical representation illustrating determination of a speeding behavior of a target.

WanderingFactor=Count/K;

Referring now to FIG. 8D, a speeding function score is calculated. For each position, a standardized speeding score is first determined as follows:

$$PreSpeedingScore = \frac{currentSpeed - \mu}{\delta}$$

A final score is then a last K point moving median determined as follows:

SpeedingScore$_i$=median(PreSpeedingScore$_i$,PreSpeedingScore$_{i-1}$, . . . ,PreSpeedingScore$_{i-k+1}$).

where K=(AverageTrajectoryLength+TrajectoryLengthStandardDeviation/2)/4.

Assignment of final score to the current sample point uses the aggregated scores of last k sample points in moving window. This reduces the false positives in score assignment by suppressing the small spikes in the sequence of score data.

With a distance factor, approaching score, wandering score, and speeding score calculated, a number of combination intentions are calculated as well. For example, a fast approaching score is calculated. The fast approaching score is the fusion of the approaching score and the speeding score. The fast approaching score is calculated as follows:

FastApproachingScore=ApproachingScore*speedingScore.

Similarly, a wandering around targets score is the fusion of the wandering score and a distance to target score that is based on the distance factor. This wandering around targets score is calculated as follows:

WanderingAroundTargetScore=min(WanderingScore, distanceToTargetScore).

Further, a speeding around targets score is the fusion of the speeding score and the distance to the target score. This speeding around targets score is calculated as follows:

SpeedingAroundTargetScore=min(SpeedingScore, distanceToTargetScore).

Turning now FIG. 11, the execution of scoring engines and spatio-temporal model update functions are preceded by data cleansing step. This data cleansing step detects the abnormal measurements obtained from camera by inspecting the consecutive observations of the same object. If the observations are inconsistent, then this data point is excluded from evaluation. Furthermore, the spatio-temporal inconsistency map for field of view of camera is accumulated dynamically and stored in knowledge warehouse.

The data cleansing step can employ many different methods by observing the measurements of the same object with the same field of view. An example efficient method utilizes the amount of change in attribute values between the previous time step and the current time step and the inconsistency in attribute values in the current time step. For example, the Minimum Bounding Box of detected object's silhouette compared against the number of pixels belonging to the detected object (Blob Size). If the ratio between the number of pixels in the minimum bounding box (MBR) calculated by (oid(t).MBR.height*oid(t).MBR.width) and oid(t).BlobSize is bigger than 5, then the observation claimed to be erroneous. For example, assuming that the oid(i).MBR.width and oid(i).MBR.height denotes the width and height of MBR of object oid at time instance i, when abs(oid(t).MBR.width−oid(t−1).MBR.width)>min(oid(t).MBR.width, oid(t−1).MBR.width) or abs(oid(t).MBR.height−oid(t−1).MBR.height)>min(oid(t).MBR.height, oid(t−1).MBR.heighth), the observation claimed to be erroneous. Similarly, by using the change in Blob size in consecutive observations, such as abs(oid(t).BlobSize−oid(t−1).BlobSize)>min(oid(t).BlobSize,oid(t−1).BlobSize), the observation claimed to be erroneous. Similarly by utilizing the motion attributes of object, the observation claimed to be erroneous when oid(t).acceleration>4*max(1.414,min(oid(t).speed,oid(t−1).speed)) where oid(t).speed denotes the speed of object at time t, and oid(t).acceleration denotes the acceleration of object at time t.

The object's historical data continues to exist in the system. The other applications (field of view lines, overlapped/non overlapped camera examples) are notified about the latest evaluations associated with the object. The association between cameras guides such notification.

The motion model of object is used to predict the future position of the object by using the learned model and historical data model. The intuition behind this prediction is that the historical data model captures how previous objects use the site. Meanwhile a motion model is fit to the object by using the last k number of observations.

The described architecture and process can be applied to real time location tracking sensor with or without utilizing the camera system to provide the same functionality.

What is claimed is:

1. A multi-perspective context sensitive behavior assessment system comprising:
   an adaptive behavior model builder, executed by a processor, establishing a real-time reference model capturing intention of motion behavior by modeling outputs of multiple user defined scoring functions with respect to multiple references of application specific target areas of interest,
   wherein at least two of the target areas have criticality values representing a user's preference regarding at least one of the target areas with respect to at least one other of the target areas, and
   wherein the outputs of the scoring functions are multiplied by the critically values to form high level sequences of representation that are communicated to the user, further comprising a behavior assessment module that performs behavior assessment by:
   using the scoring functions associated with application specific target areas to calculate an intention score, and the scoring functions assign a score to a current sample point of a trajectory by aggregating previous scores of the trajectory in a moving time window;
   normalizing the intention score by using a score assessment model that is continuously updated for each of plural application contexts;
   calculating a target-intention matrix by using the normalized intention scores with the criticality value of each target area; and
   assigning an application specific high level semantic label to a moving object by using values in the target-intention matrix and application context descriptions.

2. The system of claim 1, further comprising a set of distributed behavior assessment and detection components, wherein said distributed behavior assessment and detection components describe behaviors of trajectories as high level behaviors defined by temporal and spatial properties of the outputs of the scoring functions for each trajectory with respect to user defined target areas and user defined criticality of each target area for an application context, wherein the set of distributed behavior assessment and detection components comprises:
   a score aggregation module producing a target-score aggregation result;
   said adaptive behavior model builder that accumulates statistical behavior of motion trajectories and scores for each target area and application context;
   a set of dynamically created behavior assessment application instances that collaborate using a subscription and publication event channels;
   a knowledge warehouse storing multiple copies of low level models and behavior scoring models that are learned adaptively; and
   a multi-dimensional database managing sequences of behavior mean max scores, trajectories, and behavior models.

3. The system of claim 2, wherein said set of components further comprises a GUI notify the user of behavior assessment events and collecting feedback from the user to accumulate patterns into an application specific multidimensional indexing database.

4. The system of claim 1, wherein said model builder transforms trajectory data in real-time for each of plural application contexts by aggregating and summarizing scores obtained from a user defined set of intention detection functions and user assigned criticality weights of application specific target areas to an application specific context aware representation, wherein the application specific context aware representation is a semantic representation of time stamped events corresponding to each sample point of a motion trajectory and a set of the semantic events is decided by a specific application context.

5. The system of claim 4, wherein said model builder utilizes observations from different sensors by applying error bounds for obtaining a decreased measurement error.

6. The system of claim 4, wherein a notification of a desired application context specific behavior detection is subjected to a multidimensional fast search in the multidimensional indexing database to decide whether the notification should be filtered out.

7. The system of claim 6, wherein the multidimensional fast search employs user defined distance functions to judge the similarity.

8. The system of claim 1, wherein said model builder performs feature extraction for a trajectory associated with a deployed application by:
   (a) obtaining target specific score values by applying user selected intention functions to target areas specified in an application context;
   (b) normalizing the target specific score values by applying reference score assessment models that are continuously updated;
   (c) weighting each of the target specific score values by their respective criticality values, wherein the criticality values and the target areas user-defined;

(d) finding an element having a maximum score value in a target-score evaluation matrix; and (e) determining an application specific semantic event by using an element-specific target area and its intention function, wherein the element-specific target area is associated with the element having the maximum score value.

9. The system of claim 8, wherein said model builder performs said feature extraction for each deployed application to obtain application specific feature vectors of motion trajectory, thereby transforming a single set of motion trajectory data into application specific behavior assessments for each application context supporting multi-perspective behavior assessment of a moving object.

10. The system of claim 1, further comprising a configuration manager implementing a configuration and deployment process for multiple user applications sharing a same sensor infrastructure, wherein the configuration and deployment process includes:

selecting a camera;

defining an application identifier for one of the applications;

creating a record in a configuration manager for the application;

configuring application specific target areas of interest in a field of view of the camera;

recording descriptions of the target areas of interest in the configuration manager and associations thereof with application contexts;

producing a configuration of application specific intention functions;

recording the intention functions and their configuration in the configuration manager;

associating the intention functions with the application contexts; and deploying the application into a moving object behavior assessment system.

11. The system of claim 1, wherein said model builder adaptively builds and stores a statistical score assessment model for each of plural application contexts with respect to the application specific intention functions and target areas in an application context description, and score assessment models are built for each field of view of plural cameras.

12. The system of claim 1, wherein said model builder builds and stores measurement error models with respect to target areas of applications in different sensors, and utilizes the error models to select more reliable input that is used during an intentions calculation.

13. The system of claim 1, wherein said model builder checks data inconsistency before performing an intention evaluation, thereby suppressing erroneous observations, reducing false behavior assessments, and increasing accuracy of spatio-temporal object detection event models.

14. The system of claim 1, wherein said model builder collects and stores application specific high level behavior data obtained by transforming observed motion data for a query and report generation process, thereby supporting application specific forensic usage of the data in the system.

15. The system of claim 1, wherein said behavior assessment module is instantiated for each of the application contexts for high level interpretation of a same motion trajectory for different applications sharing a same surveillance infrastructure, thereby providing multi-perspective evaluation of the motion trajectory.

16. The system of claim 1, wherein said behavior assessment module receives a scoring evaluation of motion trajectories observed by multiple cameras for a same application specific target area and selects a most accurate evaluation by utilizing error models associated with fields of view of the multiple cameras.

17. The system of claim 1, further comprising a multidimensional indexing module supporting fast access to multi-dimensional score assessment models, error models, and normal behavior models.

18. The system of claim 1, further comprising a graphical user interface supplying a summary view of a real time global severity ranked alert summary report providing statistical summary data based on abnormal behavior assessment aggregated scores that are dynamically aggregated from at least one of: one or multiple distributed scoring sources; or one or more distributed data warehouses, thereby providing real time top ranked severity alert incidents in a graphical chart to security operation users.

19. The system of claim 1 further comprising a graphic user interface displaying a summary view of a real time global highest score dashboard report that provides statistical summary data of a max score at each time point based on abnormal behavior assessment aggregated scores that are dynamically aggregated from at least one of: one or multiple distributed scoring sources; or one or more distributed data warehouse, thereby providing a real time max score curve to provide security operation users with situational awareness summary view in terms of incident severity.

20. The system of claim 1 further comprising a graphic user interface displaying a real time view of a max score gauge dashboard for selected individual scoring function types, thereby providing a real time max score gauge of selected individual scoring function types at a current time point, and permitting users to select what scoring function types to be displayed.

21. The system of claim 20, wherein said graphic user interface also displays a statistical distribution of historical score data that is displayed contemporaneously with the gauge, and dynamically calculates a score scaling function from a learned score data model for global score normalization.

22. The system of claim 21, wherein said graphic user interface further displays a global ranking alert report that is based on global ranking of normalized scores that are compared to multiple scoring sources of same scoring function types and also to multiple scoring sources of different scoring function types.

* * * * *

UNITED STATES PATENT AND TRADEMARK OFFICE
CERTIFICATE OF CORRECTION

PATENT NO. : 8,169,481 B2
APPLICATION NO. : 12/034181
DATED : May 1, 2012
INVENTOR(S) : Hasan Timucin Ozdemir et al.

It is certified that error appears in the above-identified patent and that said Letters Patent is hereby corrected as shown below:

In item (75) of the title page, the city of residence of inventor Lipin Liu should read --Belle Mead--

In item (75) of the title page, the city of residence of inventor Namsoo Joo should read --Somerset--

In item (57) of the title page, second to last line of the Abstract, the word "critically" should read --criticality--

In column 21, line 53, claim 1, the word "critically" should read --criticality--

In column 22, line 67, claim 8, "areas user-defined" should read --areas are user-defined--

Signed and Sealed this
Twenty-fourth Day of July, 2012

David J. Kappos
*Director of the United States Patent and Trademark Office*